United States Patent [19]
Nelson et al.

[11] Patent Number: 5,537,267
[45] Date of Patent: Jul. 16, 1996

[54] APPARATUS FOR, AND METHODS OF, PROCESSING A SLAVE CASSETTE TO OBTAIN A TRANSFER OF AN IMAGE ON A MASTER TAPE TO A SLAVE TAPE IN THE SLAVE CASSETTE

[75] Inventors: Alfred M. Nelson, Redondo Beach; Charles E. Redman, Rancho Palos Verdes; Alan N. Raffaelli, Simi Valley, all of Calif.

[73] Assignee: Hightree Media Corporation, El Segundo, Calif.

[21] Appl. No.: 28,240

[22] Filed: Mar. 9, 1993

[51] Int. Cl.⁶ .............................. G11B 15/68; G11B 5/86
[52] U.S. Cl. .................. 360/92; 360/16; 360/17; 360/95
[58] Field of Search ............... 360/92, 96.5, 96.6, 360/91, 83, 84, 85, 95, 98.04, 98.06, 15, 16, 71, 17

[56] References Cited

U.S. PATENT DOCUMENTS

| | | | |
|---|---|---|---|
| 3,658,193 | 4/1972 | Gross | 360/92 X |
| 4,240,120 | 12/1980 | Padwa | 360/15 |
| 4,635,150 | 1/1987 | Kato et al. | 360/92 X |
| 4,742,405 | 5/1988 | Teranishi | 360/92 |
| 5,144,506 | 9/1992 | Sahota | 360/92 |
| 5,182,687 | 1/1993 | Campbell et al. | 360/92 |

Primary Examiner—Andrew L. Sniezek
Attorney, Agent, or Firm—Ellsworth R. Roston; Charles H. Schwartz

[57] ABSTRACT

Slave cassettes each including a slave tape and having a peripheral groove are stacked in a first station. Gripping fingers movable into the grooves in the forward cassette and the next cassette grip the forward cassette. During the pivoting of the cassette to a second station, a cover on the cassette is pivoted to expose the slave tape. At the second station, threading arms are moved from retracted to extended positions. The cassette and the threading arms are then moved to a third station planar with a pinch roller which is displaced from the capstan. The threading arms are then retracted to dispose the slave tape on the capstan. With a master tape on the pinch roller, the pinch roller is moved to a position abutting the capstan. The pinch roller and capstan are then rotated to transfer the image on the master tape to the slave tape such that the image beginning is at the slave tape beginning. The threading arms are extended; the pinch roller is moved to the displaced position; the cassette and the threading arms are moved to the second station; and the threading arms are retracted to decouple the slave tape from the capstan. The cassette is then moved to a position where belts are coupled to the cassette and the gripping fingers are thereafter released from the cassette. The belts then move the cassette to the mouth of a fourth station. Pins are rotated to move the cassette into the fourth station.

62 Claims, 24 Drawing Sheets

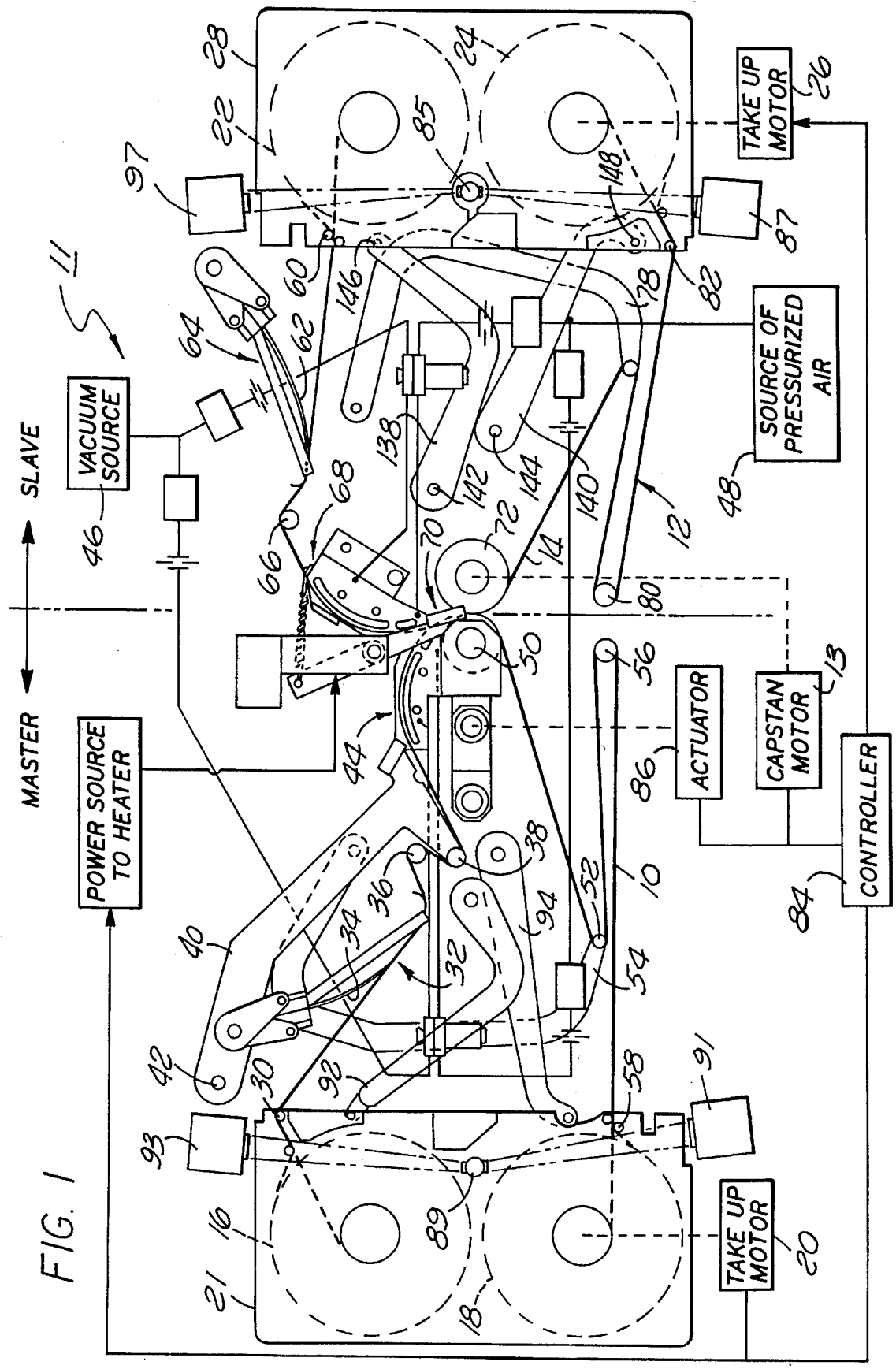

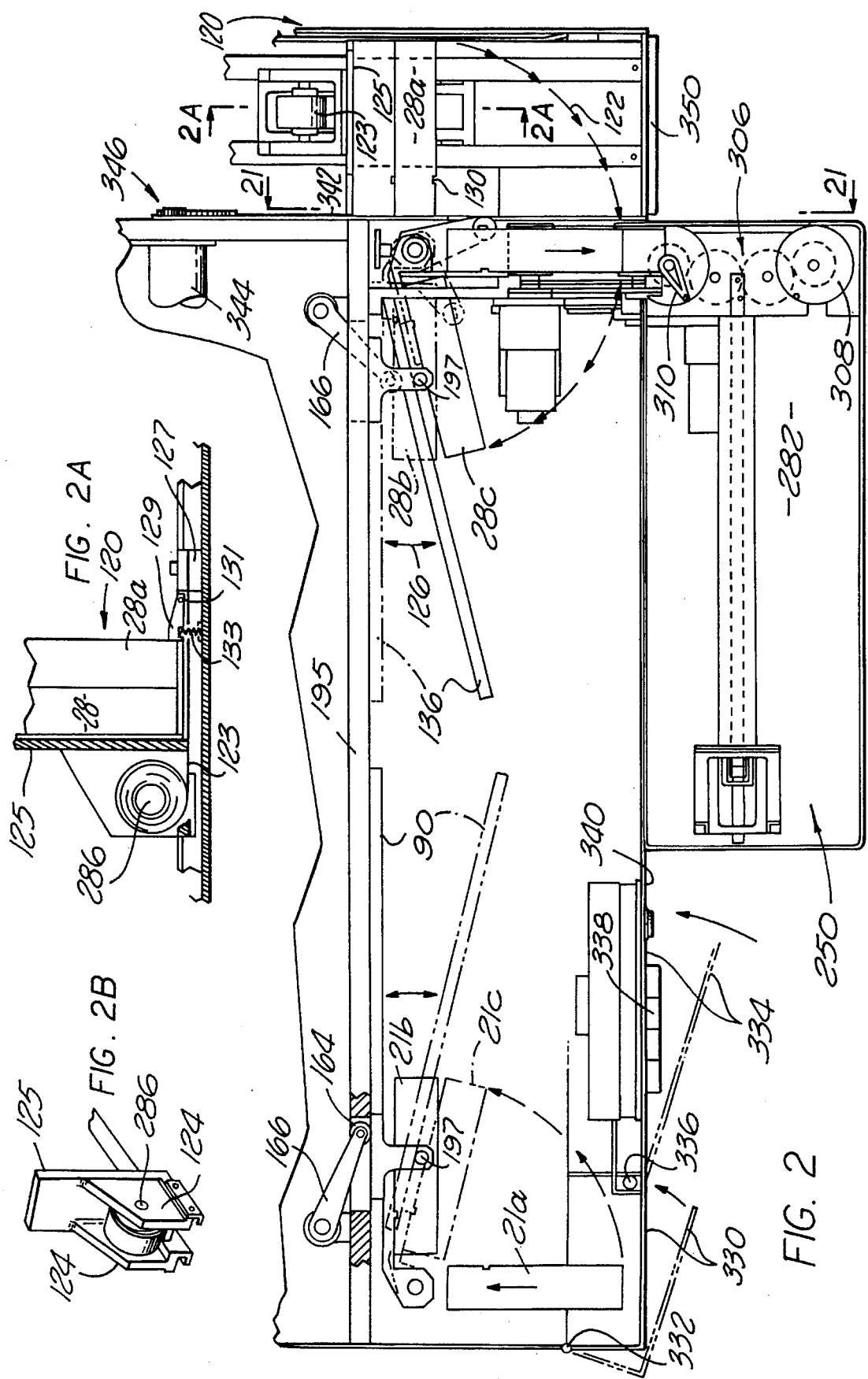

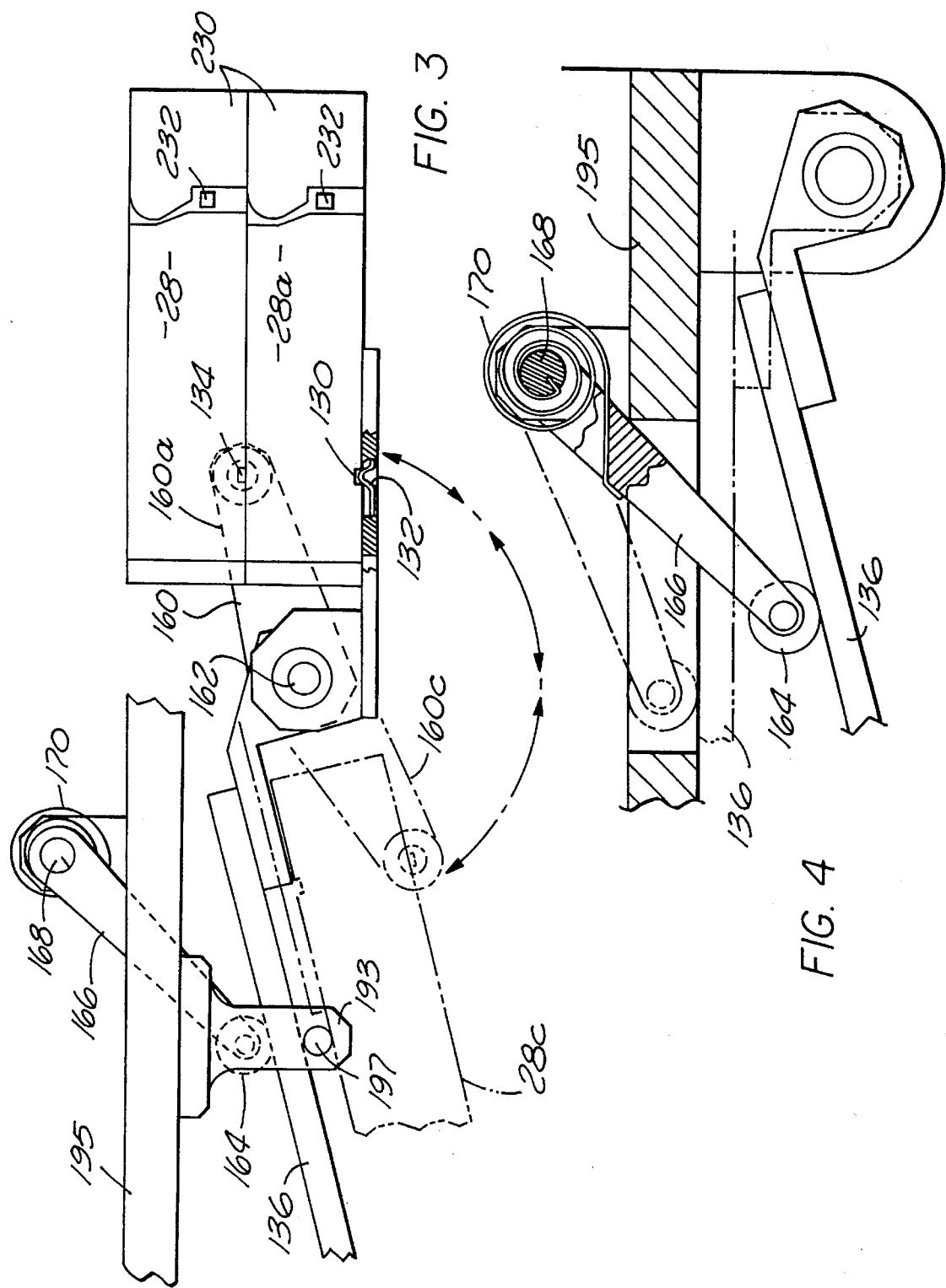

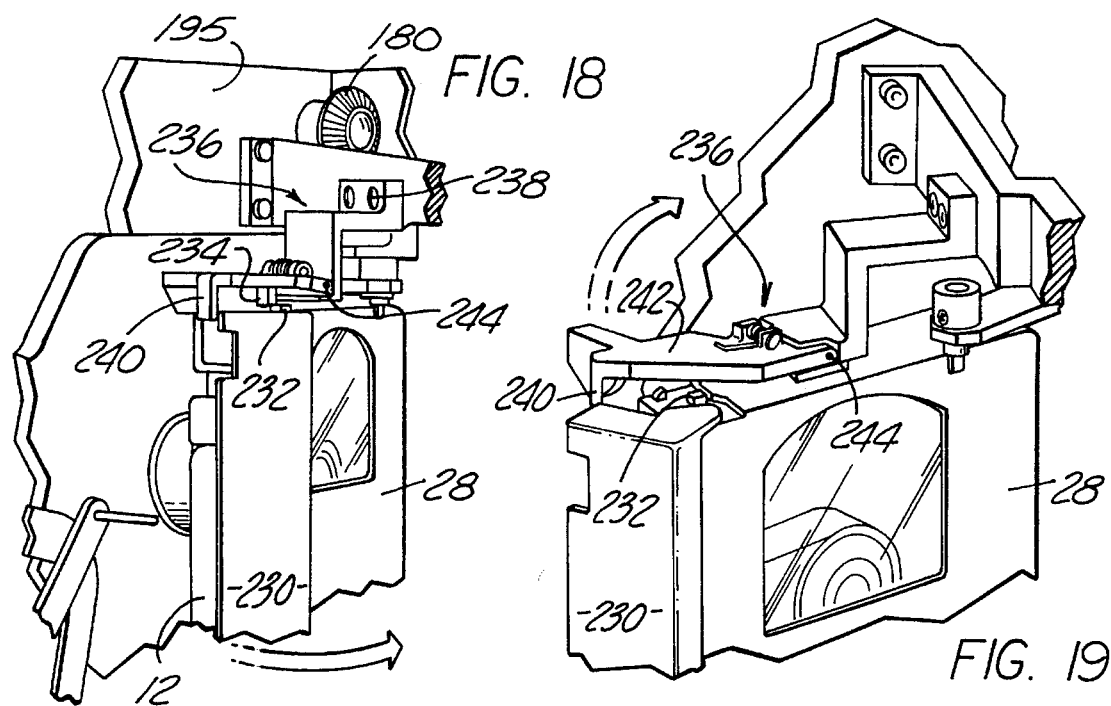
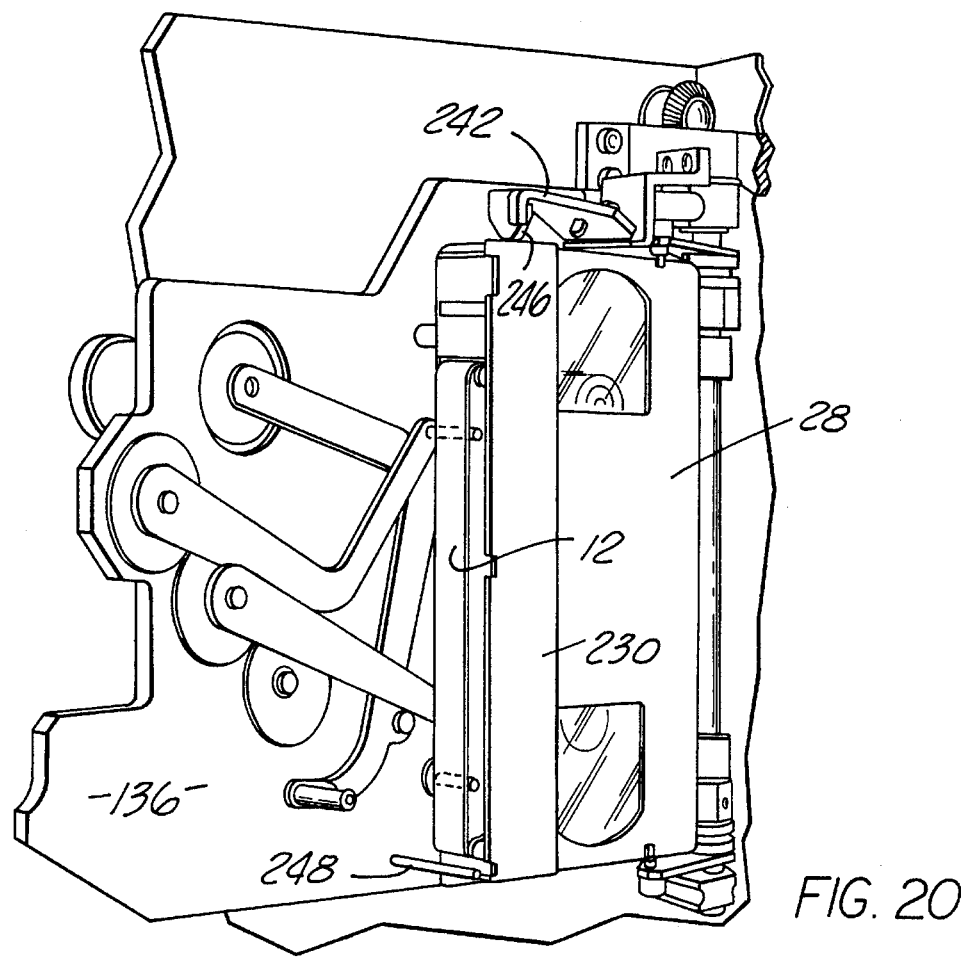

FIG. 29
FIG. 30
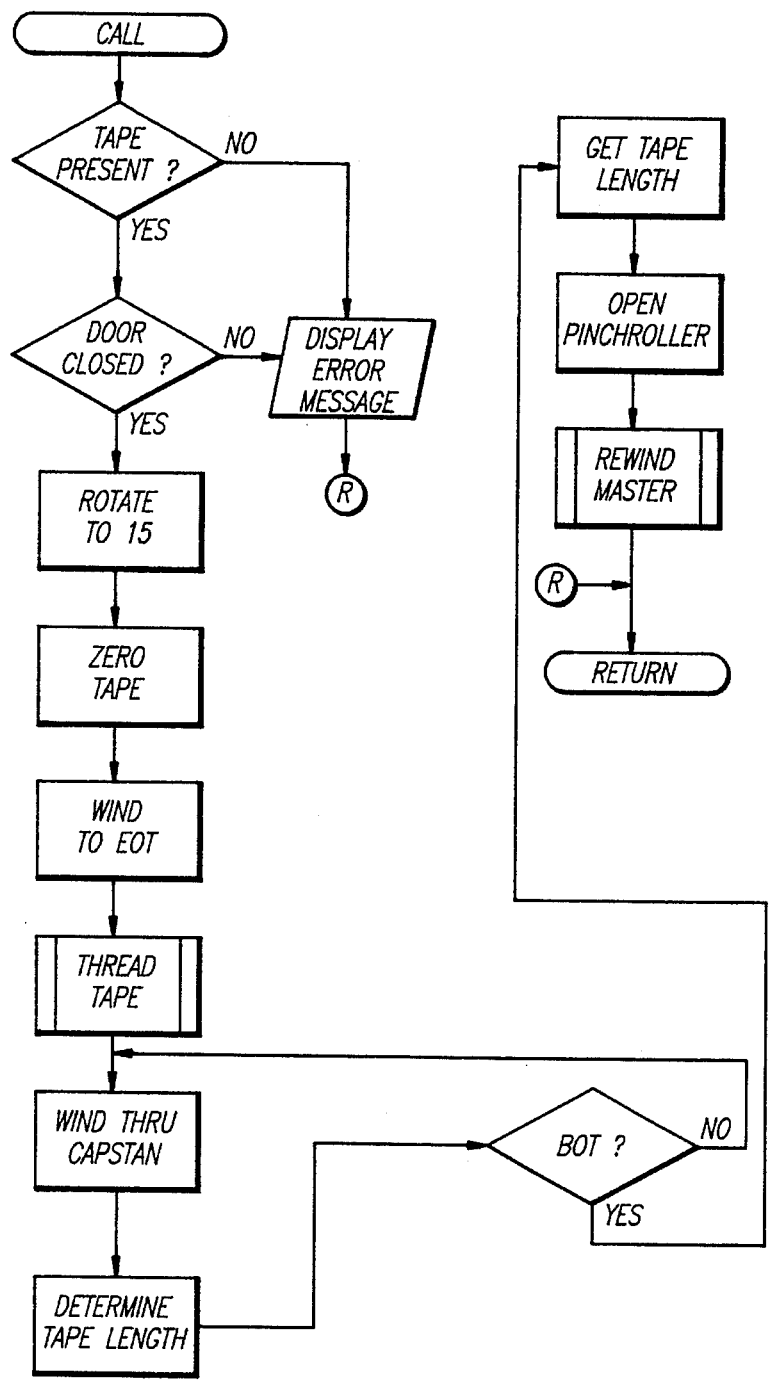
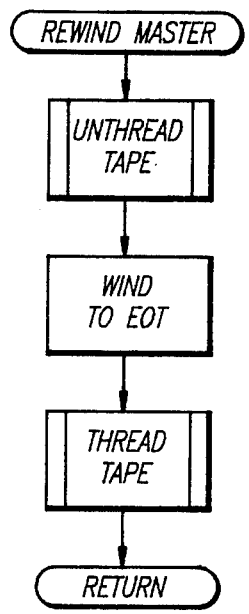

APPARATUS FOR, AND METHODS OF, PROCESSING A SLAVE CASSETTE TO OBTAIN A TRANSFER OF AN IMAGE ON A MASTER TAPE TO A SLAVE TAPE IN THE SLAVE CASSETTE

This invention relates to apparatus for, and methods of, providing slave cassettes including slave tapes in stacked relationship in a first station, transferring the slave cassettes sequentially to a second station for a transfer to the slave tapes of the image on the master tapes at such station and then stacking the slave cassettes sequentially in a third station after such image transfer. The invention also relates to apparatus for, and methods of, transferring the image on the master tape to the slave tape at the second station such that the image on the slave tape has a high resolution and the beginning of the image is at the beginning of the slave tape on a supply reel in each of the slave cassettes. The invention further relates to apparatus for, and methods of, providing the sequence of operations as specified above automatically and efficiently and with a minimal number of components such that each slave tape is processed to provide an image of high quality on such tape in a minimal period of time.

BACKGROUND OF INVENTION

Visual and audio information is often stored on a tape for playback at a subsequent time. For example, visual and audio information relating to popular motion pictures is stored on tapes. These tapes are rented or sold at neighborhood stores. A popular movie such as "Aladdin" or a movie winning an Academy Award has millions of taped copies distributed to satisfy the demands of purchasers and renters. Substantially all of these taped copies have to be made available at a pre-selected release date in order to satisfy the pent-up demand of viewers for such taped copies. Although the demand for movie rentals and sales is great, it still seems to be increasing significantly from year to year.

Visual and audio information on tapes is not only provided in the form of movies for entertainment. It is also provided in large volume for business purposes. For example, large corporations deliver messages in the form of tapes to their sales personnel to acquaint such sales personnel with the construction, operation and advantages of new products. Since large corporations employ large numbers of sales personnel, many copies of such messages have to be prepared for distribution to such sales personnel.

The visual and audio information on most tapes is in magnetic form. One reason is that information in magnetic form can be relatively easily and inexpensively reproduced. For example, most reproducing apparatus in the home use magnetic heads to read the information stored magnetically on the tapes when the tapes are inserted into such apparatus. Another reason is that tapes with information recorded in magnetic form are less expensive to reproduce than tapes in other forms such as in optical form.

One type of tape for recording information in magnetic form has a thermomagnetic layer on the tape. The thermomagnetic layer may be formed from a suitable material such as chromium dioxide. The thermomagnetic layer has a Curie temperature at or above which any magnetic information on the tape is destroyed and below which magnetic information can be recorded on the tape. Thermomagnetic tape is advantageous because information can be recorded on the thermomagnetic tape at a temperature at or somewhat below the Curie temperature by pressing a master tape against the thermomagnetic layer on the slave tape at such temperature. This causes the surface of the thermomagnetic layer to become cooled to a temperature below the Curie temperature by contact with the cool surface of the master tape. As the thermomagnetic layer cools to a temperature below the Curie temperature, the magnetic information on the magnetic tape becomes transferred to the thermomagnetic layer on the slave tape. The information on the master tape thus becomes transferred in mirror form to the thermomagnetic layer on the slave tape without having to use any magnetic heads to write information on the slave tape.

There is at least one apparatus now in use for transferring information in magnetic form on a master tape to a thermomagnetic layer on a slave tape. Although this apparatus is fast, it is large, cumbersome and expensive, and requires excessive electrical power. With the millions of copies that have to be made of a single movie such as the movie winning an Academy Award, it would be desirable to provide apparatus which is relatively inexpensive and which transfers information from a master tape to a slave tape in a minimal period of time. For example, it would be desirable to provide equipment which is relatively inexpensive and which reproduces a two (2) hour movie in approximately thirty (30) to sixty (60) seconds without any need for using magnetic reproducing heads. Because of the desire, and actually the need, for such apparatus, a considerable effort has been devoted, and a significant amount of money has been expended, to develop apparatus which meet such criteria. In spite of such effort and such money expenditure, no satisfactory apparatus meeting such criteria has been provided to this date.

The invention disclosed and claimed in application Ser. No. 07/733,174 filed by us on Jul. 19, 1991 for a "Tape Duplicating System" and assigned by us to the assignee of record in this application provides apparatus which more than meets the criteria specified in the previous paragraph. It is able to record a two (2) hour movie in approximately thirty (30) to sixty (60) seconds such that the duplicated copy has the visual and audio fidelity of the original or master copy. It is compact so that it occupies relatively little space. This is important when a large number of apparatuses are used simultaneously in an enclosure such as a room to make duplicate copies. For example, the apparatus can be used to transfer the information on master-master tape to a master tape, and subsequently the same apparatus can be used to transfer the information on the master tape to a slave tape, all without using recording heads.

In one embodiment of the invention disclosed and claimed in application Ser. No. 07/733,174, a master tape moves between first supply and take-up reels over a pinch roller. A slave tape moves between second supply and take-up reels over a capstan. First and second guides can be respectively constructed and adjustably positioned to regulate the movement of the master and slave tapes to aligned positions on the pinch roller and the capstan. A heater disposed between the pinch roller and the second guide heats only a thermomagnetic layer on the slave tape to at least the Curie temperature. The heater is adjustable in position to facilitate the movement of the slave tape to the aligned position on the capstan. A brake shoe between the capstan and the second supply reel controls the tension of the slave tape and damps any variations in the tension of the slave tape. A brake shoe between the pinch roller and the first supply reel controls the tension of the master tape and damps any variations in the tension of the master tape.

The pinch roller is movable to a first position, locked in position relative to the capstan, in which it abuts the capstan to facilitate the transfer of magnetic information from the master tape to the slave tape. In this disposition, the pinch roller locks the heater in a fixed position relative to the capstan. The pinch roller and the associated guide are movable to a second position displaced from the capstan to facilitate the disposition of the master tape on the pinch roller and the slave tape on the capstan. The heater is pivotable relative to the capstan to facilitate the disposition of the slave tape on the capstan. The capstan, preferably of a unitary construction, receives forces to maintain the rotational axis of the capstan substantially constant.

Since the tapes pass over surfaces between the brake shoes and the capstan and the pinch roller, the tensions on the master and slave tapes are not as closely regulated at the position of transfer of the magnetic information from the master tape to the slave tape as might otherwise be desired. Specifically, the tapes pass over alignment guides which have a variable friction with time and physical conditions. This variable friction inhibits a precise regulation of the tape tensions at the abutting positions between the capstan and the pinch roller where the magnetic information is transferred to the slave tape.

In one embodiment of the invention disclosed and claimed by us in application Ser. No. 07/886,688 filed by us on May 19, 1992, for a "Tape Duplicating System" and assigned by us of record to the assignee of record of this application, a master tape movable in a closed loop including a pinch roller transfers a mirror image to a slave tape movable in a closed loop including a capstan. A thermomagnetic layer on the slave tape has a Curie temperature above which magnetic information is destroyed and below which magnetic information can be recorded on such layer. The thermomagnetic layer is heated above the Curie temperature and is accordingly lengthened by thermal expansion just before the slave tape reaches the capstan.

A first guide contiguous to the heater regulates the tension of the slave tape. A downstream portion of a peripheral surface, preferably defining a cylindrical segment, on the guide receives a pressurized fluid for sensing the tape tension in accordance with the tape width, the spacing from the axis of the peripheral surface and the fluid pressure. An upstream portion of the peripheral surface receives a vacuum adjustable to vary the spacing between the slave tape and the downstream portion. This regulates the tape tension.

The master tape is lengthened by a second guide having the same construction as the first guide to compensate for the lengthening of the slave tape by the heater and the first guide, thereby producing a true mirror image on the slave tape after the slave tape has cooled to the ambient temperature. Each of the master tape and the slave tape has a particular product of the Youngs modulus, tape width and tape thickness to provide a controlled strain on the tape when the tension on the tape is regulated.

The invention disclosed and claimed in application Ser. No. 07/886,688 provides apparatus for, and methods of, regulating the tension of the master tape at a position contiguous to the pinch roller and for regulating the tension of the slave tape at a position contiguous to the heater, which is in turn contiguous to the capstan. The apparatus and method of application Ser. No. 07/886,688 are adapted to be used in the apparatus and method of co-pending application Ser. No. 07/733,174 and to constitute an improvement in the apparatus and method of co-pending application Ser. No. 07/733,174. Co-pending application Ser. No. 07/733,174 also provides a master tape and a slave tape which may be constructed especially for the apparatus and method of the invention disclosed in such application to obtain all of the advantages provided by the apparatus and method of such application.

In one embodiment of the invention disclosed and claimed in application Ser. No. 08/026,697 filed by us on Mar. 5, 1993, for a "Tape Duplicating System" and assigned of record to the assignee of record of this application, a master tape moves from a first supply reel to a first take-up reel in a first cassette. A slave tape moves from a second supply reel to a second take-up reel in a second cassette. A pinch roller locked in a first position between the first supply and take-up reels abuts a capstan between the second supply and take-up reels to transfer to the slave tape the image on the master tape. At the end of such transfer, a signal sensing the completion of the transfer causes the pinch roller to be unlocked and to be moved to a second position displaced from the first position. In this position, the second cassette is replaceable by another one of the second cassettes for an image transfer from the master tape.

In the invention disclosed and claimed in application Ser. No. 08/026,697, the rotations of the supply reels produce eccentricities which vary the tensions of the tapes as the supply reels rotate. These tension variations are compensated at positions before the pinch roller and the capstan by springs guiding the tapes and by damping members attached to the springs. The damping members are pre-stressed to provide damped compliances in accordance with the tension variations. Stiffeners are attached to the spring ends to provide for the compliances by the springs.

Application Ser. No. 08/026,697 also discloses and claims a capstan which may be hollow and non-magnetic to receive a magnetic head within the capstan. A constant amplitude alternating signal applied to the head to apply initially rising and then decaying amplitudes to the tape as it is displaced from the head erases any image on the slave tape by providing a magnetizing force greater than that of the slave tape but less than that of the master tape. Thus, the image on the master tape is transferred to the slave tape by the abutting tape relationship.

BRIEF DESCRIPTION OF INVENTION

In one embodiment of this invention, apparatus is provided for sequentially transferring a plurality of slave cassettes from a supply station and for processing the slave tapes in such slave cassettes to obtain a transfer to the slave tapes of an image on a master tape. The apparatus also provides for moving the slave cassettes to another station after the transfer of the image to the slave tapes and for storing the slave tapes in a stacked relationship in such other station. The apparatus provides such image transfers in a minimal time and with a minimal number of components and with a high resolution in the transfer of the image on the master tape to the slave tapes. The invention also includes methods of providing the functions specified above in this paragraph.

In one embodiment of the invention, slave cassettes each including a slave tape and having a peripheral groove are stacked in a first station. Gripping fingers are movable into the groove in the forward cassette, and into the groove in the next cassette, in the station grip the forward cassette. During the pivoting of the forward cassette to a second station, a cover on the slave cassette is pivoted to expose the slave tape. At the second station, the threading arms are moved from retracted to extended position.

The slave cassette and the threading arms are then moved to a third station planar with a pinch roller which is displaced from the capstan. The threading arms are then retracted. With a master tape disposed on the pinch roller, the pinch roller is moved to a second position abutting the capstan. The pinch roller and capstan are then rotated to transfer the image on the master tape to the slave tape such that the image beginning is at the slave tape beginning. The pinch roller is moved to the displaced position; the threading arms are extended; the cassette is moved to the second station to decouple the slave tape from the capstan; and the threading arms are retracted.

The cassette is then moved to a position where belts are coupled to the cassette and the gripping fingers are thereafter released from the cassette. The belts then move the cassette to the mouth of a fourth station. Pins are rotated to position the cassette properly relative to the mouth of the fourth station. Continued pin rotations produce a movement of the cassette through the mouth and into the fourth station.

BRIEF DESCRIPTION OF DRAWINGS

In the drawings:

FIG. 1 is a schematic diagram of a system in an operative relationship for transferring an image on a master tape to a slave tape;

FIG. 2 is a schematic plan view of different elements in the apparatus of this invention and schematically illustrates the operation of the apparatus at different stations;

FIG. 2A is a sectional view taken substantially on the line 2A—2A of FIG. 2 and illustrates in additional detail certain features of a first (supply) station for holding the slave cassettes in a stacked relationship before the slave cassettes are transferred to other stations;

FIG. 2B is a perspective view of a spring shown in FIGS. 2 and 2A for holding the slave cassettes in the stacked relationship in the first station;

FIG. 3 is an enlarged fragmentary schematic plan view of apparatus for transferring the slave cassettes from the first (supply) station to a second (threading) station and then to a third (image transfer) station for transferring the image on the master tape to the slave tape;

FIG. 4 is an enlarged fragmentary schematic plan view of the apparatus shown in FIG. 3 and is partially sectioned to show in additional detail the apparatus for moving the slave cassette from the second (threading) station to the third (image transfer) station;

FIG. 18 is a fragmentary perspective view of apparatus for pivoting the cover on the slave cassette to expose the slave tape in the slave cassette during the movement of the slave cassette from the first (supply) station to the second (threading) station;

FIG. 19 is a fragmentary perspective view of apparatus for pivoting the cover for the slave cassette with the cover partially pivoted from the slave cassette to expose the slave cassette;

FIG. 20 is a perspective view of the apparatus shown in FIGS. 18 and 19 and shows such cover completely pivoted from the slave cassette to expose the slave tape in such cassette and further shows a pin at the second (threading) station to maintain the cover in the fully pivoted position;

FIG. 29 is a flow diagram of a subroutine indicating the sequence of steps performed in determining the length of the image or movie on the master tape and in then positioning the master tape to initiate the transfer of the image or movie on the master tape to the slave tape;

FIG. 30 is a flow diagram of a subroutine for positioning the master tape on the supply reel to transfer an image on the master tape to a slave tape;

DETAILED DESCRIPTION OF INVENTION

Figure 5:
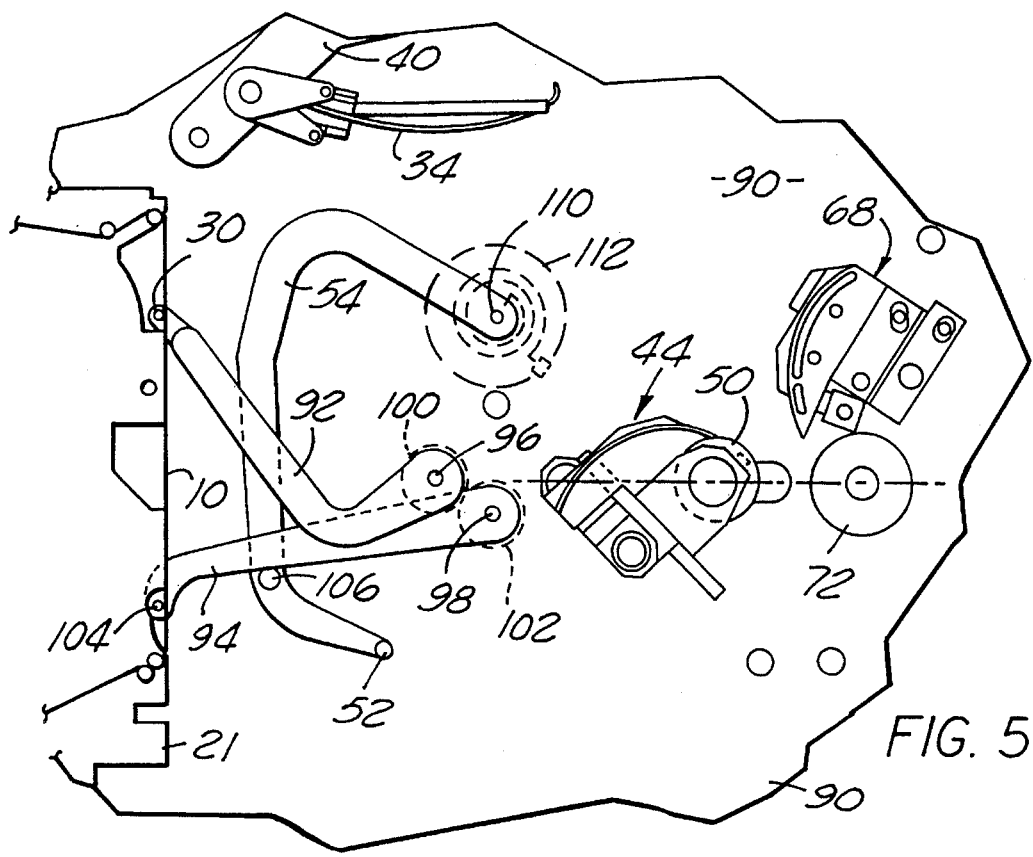
FIG. 5 is an enlarged fragmentary view of threading and dancer arms for the master cassette in retracted positions at the second (threading) station with the master tape still in the master cassette and with the threading arms engaging the master tape in the master cassette.

Basic aspects of the system constituting this invention are disclosed and claimed in application Ser. No. 07/733,174 filed by Alfred M. Nelson and Robert P. Adams on Jul. 19, 1991, for a "Tape Duplicating System" and assigned of record to the assignee of record of this application. Improvements in this system are disclosed and claimed in application Ser. No. 07/886,688 filed by Alfred M. Nelson and Robert P. Adams on May 19, 1992, for a "Tape Duplicating System" and assigned of record to the assignee of record of this application. Additional improvements are disclosed and claimed in application Ser. No. 08/026,697 filed by Alfred M. Nelson and Robert P. Adams on Mar. 5, 1993, for a "Tape Duplicating System" and assigned of record to the assignee of record of this application. If any additional information should be needed to complete the disclosure of the invention claimed in this application, applicants intend to have such co-pending applications complete the disclosure. This is particularly true since applicants provide only a limited disclosure in this application of some of the features common to the co-pending applications.

In one embodiment of the invention generally indicated at 11, a master tape 10 (FIG. 1) is provided with a mirror image of information such as visual pictures and aural sound to be reproduced on a slave tape 12. Preferably the mirror image of the visual and aural information is recorded in magnetic form on the master tape 10. The mirror image may be recorded in either analog or digital form. The visual and aural information may be provided in a layer of a magnetizable oxide such as an iron oxide on the surface of the master tape. The magnetizable oxide may be formed in a conventional manner on the master tape 10.

The slave tape 12 (FIG. 1) preferably has a thermomagnetic layer on the tape. The thermomagnetic layer may be formed on the slave tape 12 from a suitable material such as chromium dioxide in a manner well known in the art. The thermomagnetic layer preferably has a Curie temperature above which magnetic information in the thermomagnetic layer is destroyed and below which the magnetic information on the master tape can be transferred in the mirror image to the thermomagnetic layer 14 on the slave tape by contact between the master and slave tapes. Preferably the image transfer occurs at a temperature close to the Curie temperature. When this occurs, the image transfer can occur by pressing the master and slave tapes together and can occur without any need to provide magnetic heads for transferring the magnetic information from the master tape 10 to the thermomagnetic layer on the slave tape 12. It will be appreciated that the magnetic layer on the master tape 10 may also be formed from a thermomagnetic material. It will be further appreciated that the slave tape 12 does not have to have a thermomagnetic layer and that the image can be magnetically transferred from the master tape 10 to the slave tape 12 by other techniques than thermomagnetic techniques.

The master tape 10 can be initially wound on a supply reel 16 and can then be unwound from the supply reel 16 and wound on a take-up reel 18. The unwinding of the master tape 10 from the supply reel 16 can be provided by a capstan motor 13 (FIG. 1) and the winding of the master tape on the take-up 18 reel can occur through the operation of a take-up motor 20 (FIG. 1). The reels 16 and 18 and the take-up motor 20 can be constructed in a conventional manner as in a video cassette 21 found in many homes. Similarly, a supply reel 22, a take-up reel 24 and a take-up motor 26 can be provided in a video cassette 28 for the slave tape 12. The cassettes 21 and 28 can be those used in video cassette recorders (VCR) for some time available commercially for showing home movies.

Figure 6:
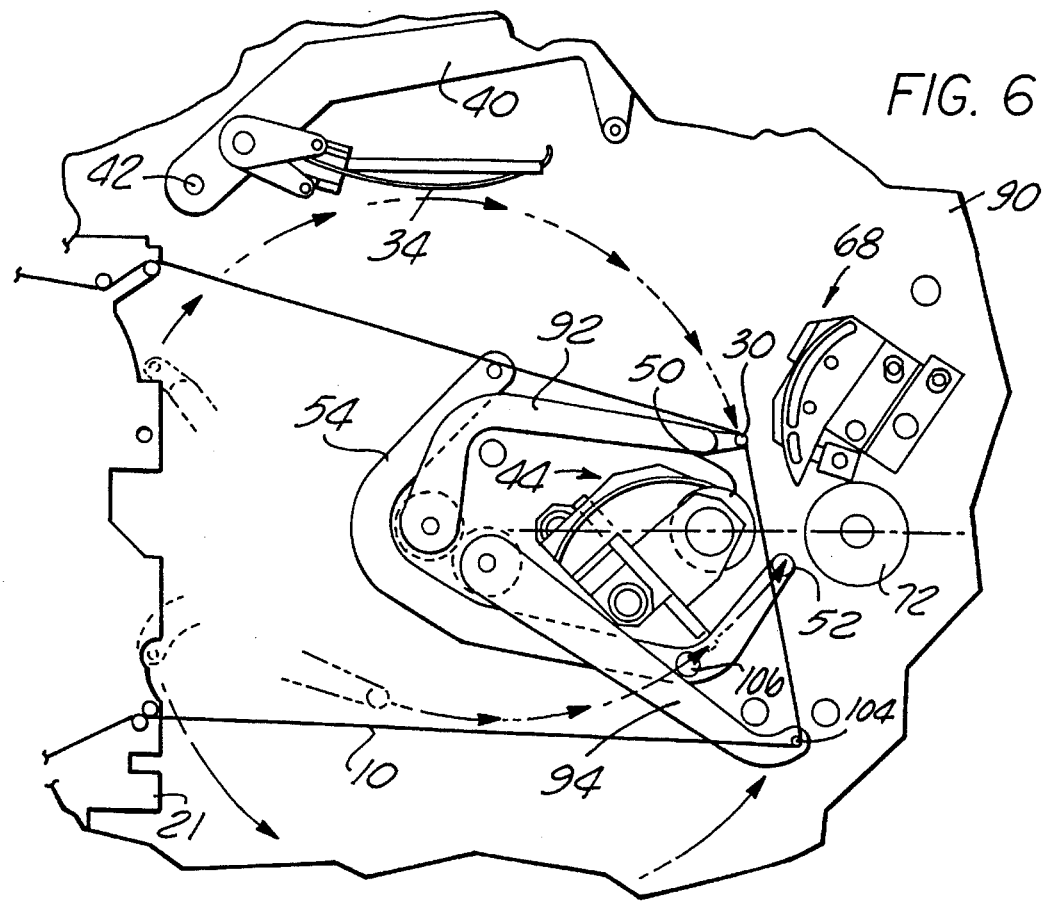
FIG. 6 is an enlarged fragmentary view similar to that shown in FIG. 5 and the threading and dancer arms for the master cassette in extended positions at the third image transfer station with the master tape raised over a pinch roller and a guide to become disposed on the pinch roller and the guide as shown in FIG. 1 when the threading and dancer arms are returned to their retracted positions.

FIG. 1 shows a system for transferring the image on the master tape 10 to the slave tape 12. The master tape 10 extends from the supply reel 16 over a pin 30 in the cassette 21 to tensioning apparatus generally indicated at 32 for maintaining a substantially tension on the master tape regardless of variations in tape tension resulting from eccentricities in the rotation of the supply reel. The tensioning apparatus 32 is disclosed in detail and claimed in application Ser. No. 08/026,697. The tape 10 is disposed on a spring 34 in the tensioning apparatus 32 and is then extended around pins 36 and 38. The tensioning apparatus 32 and the pins 36 and 38 are disposed on a member 40 pivotable as at 42 between an operative position shown in solid lines in FIG. 1 and a position displaced in a counterclockwise direction from the operative position as shown in FIGS. 5 and 6. The tensioning apparatus 32 may be considered as an articulator when the flow charts shown in FIGS. 29–35 for providing subroutines are discussed subsequently in this specification.

The tape 10 then extends over a guide generally indicated at 44 in FIG. 1. The construction and operation of the guide 44 are fully disclosed and claimed in co-pending application Ser. No. 07/886,688. The guide 44 receives a vacuum from a source 46 at its upstream end in the direction of tape movement and air under pressure from a source 48 at its downstream end. In this way, the tension of the master tape 10 is regulated at a substantially constant value just before the master tape moves to the periphery of a pinch roller 50. The master tape 10 then extends around a pin 52 at the end of a dancer arm 54, around a pin 56 and between a pair of pins 58 in the cassette 21 to the take-up reel 18 in the cassette.

The slave tape 12 extends from the supply reel 22 between a pair of pins 60 in the slave cassette 28 and then on the end of a spring 62 in tensioning apparatus generally indicated at 64. The tensioning apparatus 64 is also referred to as "an articulator" in the subsequent discussion relating to the flow charts shown in FIGS. 29–35. The tensioning apparatus 64 may have a construction and operation corresponding to the construction and operation of the tensioning apparatus 32. In this way, the tensioning apparatus 64 compensates in the tension of the slave tape 12 for changes in tension resulting from eccentricities in the rotation of the supply reel 22.

The slave tape 12 then extends over a pin 66 to a guide generally indicated at 68. The guide 68 corresponds in function and operation to the guide 44. The guide 68 regulates the tension of the slave tape 12 just before the slave tape reaches a heater generally indicated at 70. The heater may have a construction and operation such as disclosed and claimed in co-pending application Ser. No. 07/733,174. In this way, the tensions of the master tape 10 and the slave tape 12 are respectively regulated by the guides 44 and 68 so that the image on the slave tape 12 will conform to the image on the master tape 10 after the thermomagnetic layer on the slave tape has cooled to ambient temperatures. In effect, the guide 68 compensates for the extra length imparted to the slave tape 12 by the stretching resulting from the heater 70.

The heater 70 is disposed between the guide 68 and a capstan 72 in contiguous relationship to the guide and the capstan. The capstan 72 abuts the pinch roller 50 in one operative relationship of the pinch roller and the slave tape 12 extends over the capstan. The capstan 72 is driven by the motor 13. The capstan 72 and the pinch roller 50 accordingly press the slave tape 12 against the master tape 10 after the heater 70 has heated the thermomagnetic layer on the slave tape to a temperature above the Curie temperature of the thermomagnetic layer to destroy any image in the thermomagnetic layer.

It will be appreciated that the capstan 72, the heater 70 and the guide 68 can be interchanged with the guide 44 and the pinch roller 50 without departing from the scope of the invention. The claims in the application should accordingly be interpreted broadly to cover the possibility of such an interchange.

The contact between the master tape 10 and the slave tape 12 causes the slave tape to be cooled below the Curie temperature and the image on the master tape 10 to be transferred to the thermomagnetic layer on the slave tape. The slave tape 12 then extends around a pin 76 at the end of a dancer arm 78 and around a pin 80 to a pin 82 in the cassette 28. The slave tape 12 extends from the pin 82 to the take-up reel 24.

A controller 84 in FIG. 1 controls the operation of the take-up motors 20 and 26 for the take-up reels 18 and 24, the drive motor 13 and the power source to the heater 70. The controller 84 also controls the operation of an actuator 86 which moves the guide 44 and the pinch roller 50 to a first position with the pinch roller abutting the capstan 72 and a second position with the pinch roller displaced from the capstan. In the first position of the pinch roller 50, the image on the master tape is transferred to the slave tape 12 when the pinch roller and the capstan 72 are rotated. In the second position of the pinch roller 50, the master tape 10 can be disposed on the pinch roller and the slave tape 12 can be disposed on the capstan 72.

Figure 13:
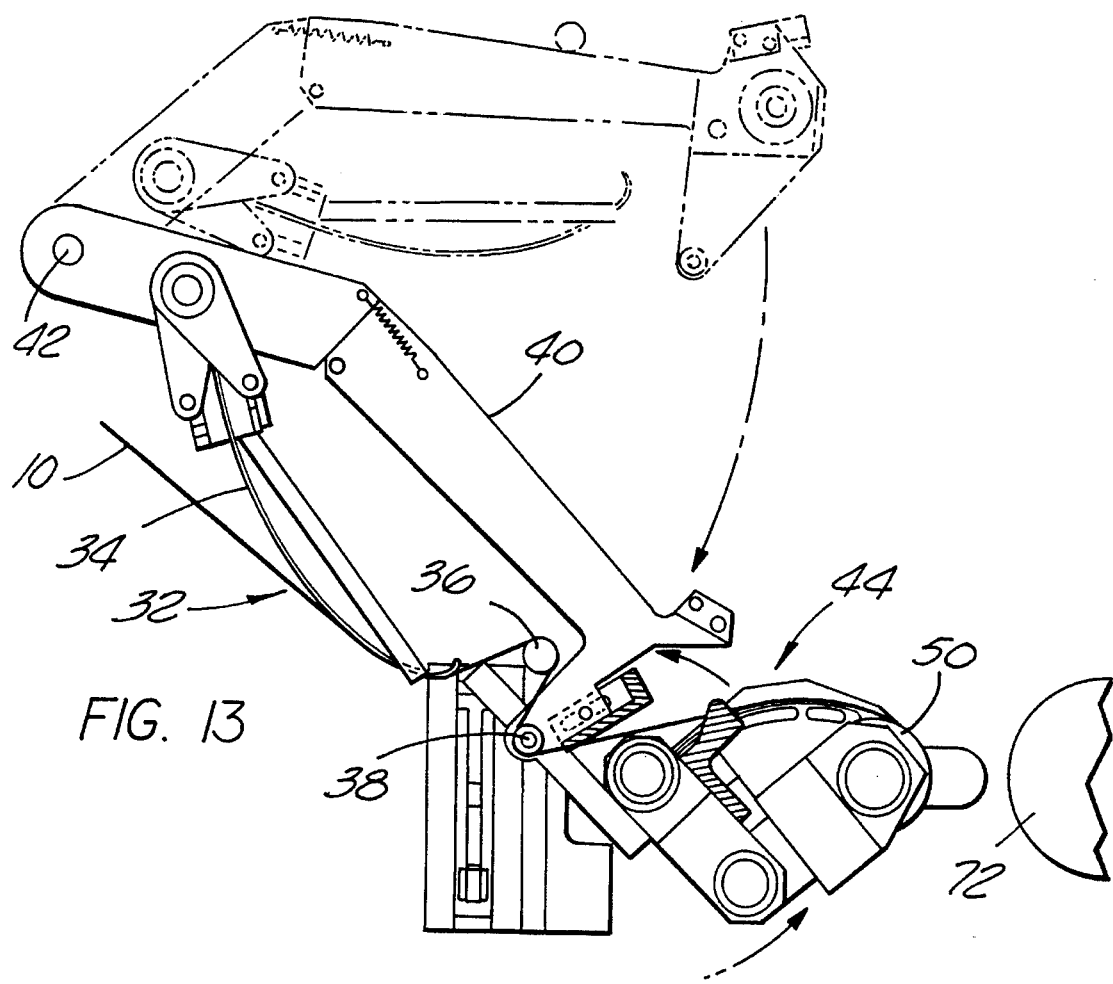
FIG. 13 is a schematic fragmentary elevational view of the pinch roller and the tensioning guide contiguous to the pinch roller with the pinch roller and the guide displaced from the capstan to facilitate the disposition of the master tape on the guide and the pinch roller and further illustrates additional tensioning apparatus for the master tape, such additional tensioning apparatus being shown in solid lines in an operative position and in broken lines in a displaced position during the threading of the master tape.
Figure 14:
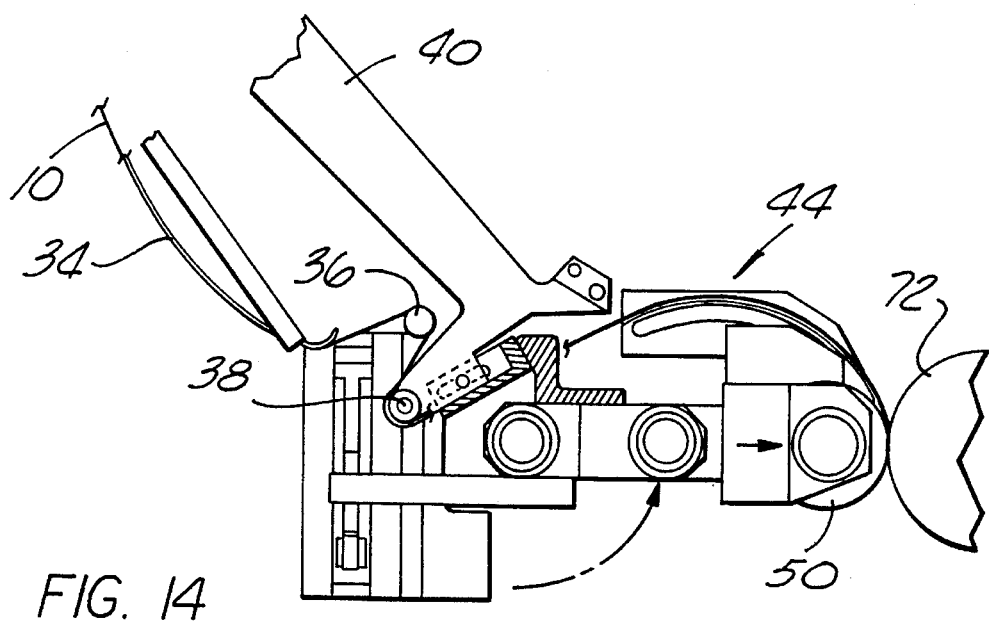
FIG. 14 is a schematic fragmentary plan view similar to that shown in FIG. 13 but with the pinch roller and the guide in a second position where the pinch roller abuts the capstan and with the tensioning apparatus in the operative position.

An infrared source 85 is in an aperture in the slave cassette 28. An infra-red detector 87 receives the light from the source 85 and produce a signal when substantially all of the image on the master tape 10 has been transferred to the slave tape 12. This causes the pinch roller to be moved from the position (FIG. 14) abutting the capstan 72 to the position (FIG. 13) displaced from the capstan. In the displaced position of the pinch roller 50, the capstan 72 is immediately stopped by de-energizing the drive motor 13 (FIG. 1). An infrared detector 89 detects when the slave tape 12 is broken or when all of the slave tape has been transferred from the supply reel 22. An infrared source 89 and an infra-red detector 91 may be similarly provided for the master tape 10. An infrared detector 93 detects when the master tape 10 is broken or when all of the master tape has been transferred from the supply reel 16.

The system shown in FIG. 1 and described above has certain important advantages. It provides for the transfer of the image on the master tape 10 in the cassette 21 to the slave tape 12 in the cassette 28. Since the image transfer is from the tape in the cassette 21 to the tape in the cassette 28, the system can be relatively small and simple. Furthermore, since the image on the master tape 10 is transferred to the slave tape 12 in the cassette 28, the image on the slave tape is ready for immediate display since the cassette is a video cassette reproducer (VCR) of standard construction. The system is also advantageous in regulating the tensions of the master and slave tapes during the transfer of the image on the master tape to the slave tape. This provides for the transfer of the image on the master tape with high fidelity to the slave tape.

The system shown in FIG. 1 is disposed at a 0° station where the image on the master tape 10 can be transferred to the slave tape 12. In this station, all of the components shown in FIG. 1 are in a common plane. Stated differently, the master cassette 21 is perpendicular to the pinch roller 50 and the slave cassette 28 is perpendicular to the capstan 72. Before the image on the master tape 10 can be transferred to the slave tape 12, the master tape 10 has to be disposed on the guide 44 and the pinch roller 50 and the slave tape 12 has to be disposed on the guide 68, the heater 70 and the capstan 72. This is accomplished with certain components shown in FIG. 1 in positions defining a 15° station. In the 15° station, certain of the components defining the path of the slave tape 12 in FIG. 1 may be considered as being tilted upwardly from the plane of the paper through a suitable angle such as approximately 15° with the right end of the cassette 28 in FIG. 1 as a fulcrum. Similarly, the components defining the path of the master tape 12 in FIG. 1 may be considered as being tilted upwardly from the plane of the paper through an angle such as approximately 15° with the fulcrum near the left end of the cassette 21 in FIG. 1.

The master tape 10 is initially disposed on a plate 90 (FIG. 2) at a suitable angle such as an angle of approximately 90° to the flat surface shown in FIG. 1. This flat surface is common to the guide 44, the pinch roller 50, the guide 68, the heater 70 and the capstan 72, the master tape 10 and the slave tape 12 during the time that the image on the master tape 10 is being transferred to the slave tape 12. This flat surface may be considered to be a 0° position or station. The position of the master cassette 21 at the 90° position is illustrated schematically at 21a in FIG. 2 and the position of the master cassette 21 at the 0° position is illustrated schematically at 21b in FIG. 2.

Before the master tape 10 is transferred from the 90° position or station 21a to the 0° position or station 21b, it is transferred to a position or station 21c. The position of the station 21c is between the positions or stations 21a and 21b and is at a suitable angle such as 15° relative to the 0° position 21b. The plate 90 (FIGS. 2, 5 and 6) is initially disposed at the 15° position 21c. The plate 90 holds a pair of threading arms 92 and 94 (FIGS. 5 and 6) and the dancer arm 54. The threading arms 92 and 94 are respectively pivotable on pins as at 96 and 98 between retracted and extended positions.

The pivoting of the threading arms 92 and 94 is synchronized by the of meshing gears 100 and 102 (FIGS. 5 and 6) respectively disposed on the pins 96 and 98. The pin 30 (also shown in FIG. 1) is disposed at the free end of the threading arm 92 and a pin 104 is disposed at the free end of the threading arm 94. As shown in FIGS. 5 and 6, the threading arm 94 engages a lug 106 on the dancer arm 54 to pivot the dancer arm from the retracted position shown in FIG. 5 to the extended position shown in FIG. 6 as the threading arm pivots from the retracted position shown in FIG. 5 to the extended position shown in FIG. 6. The dancer arm 54 is pivotable as at 110 and is spring loaded as at 112 to return the dancer arm from the extended position shown in FIG. 6 to the retracted position shown in FIG. 5 when the threading arms 92 and 94 return from the extended positions shown in FIG. 6 to the retracted positions shown in FIG. 5.

In the position shown in FIG. 5, the pin 30 on the threading arm 92 and the pin 104 on the threading arm 94 engage the master tape while the master tape 10 is still entirely within the cassette 21. This is the 15° position of the station discussed above and is indicated at 21c in FIG. 2. With the cassette 21 disposed on the plate 90 in the position of the station 21c (FIG. 2), the threading arms 92 and 94 are pivoted from the retracted positions shown in FIG. 5 to the extended positions shown in FIG. 6. When the threading arm 94 is pivoted to the position shown in FIG. 6, the threading arm 94 engages the lug 106 and moves the dancer arm 54 to the position shown in FIG. 6 against the action of the helical spring 112.

In the position shown in FIG. 6, the pins 30 and 104 respectively on the threader arms 92 and 94 dispose the master tape 10 outwardly from the master cassette 21. The pin 52 on the dancer arm 54 engages the master tape 10 tightly against the pin 104. The plate 90 is then moved from the station 21c (the 15° position) to the station 21 (the 0°) position in FIG. 2.

At the station 21b shown in FIG. 2, the threading arms 92 and 94 are retracted from the extended position shown in FIG. 6 to the position shown in FIG. 5. As the threading arms 92 and 94 retract, the dancer arm 54 retracts because of the action of the spring 112. As the threading arms 92 and 94 retract from the position shown in FIG. 6 to the position shown in FIG. 5, the articulator 32 pivots on the pin 42 from the position shown in FIGS. 5 and 6 to the position shown in FIG. 1 so that the master tape 10 becomes disposed on the spring arm 34 at the end of the spring arm. This causes the master tape 10 to become disposed on the spring arm 34, the guide 44 and the pinch roller 50 as shown in FIG. 1.

The slave tape 12 receives a sequence of operations similar to that shown in FIGS. 1, 2, 5 and 6 for the master tape 10 and described above. The slave cassette 28 has different stations corresponding to the different stations for the master tape. Specifically, a plurality of slave cassettes 28 are disposed in a stacked relationship in a station generally indicated at 120 in FIG. 2. The forward cassette in the station 120 is designated as 28a to indicate its correspondence to the station 21a for the master cassette.

The slave cassettes 28 are retained in the station 120 as by a leaf spring 123 (FIGS. 2, 2A and 2B) wound in a helical configuration at one end on a pin 135. The helical portion of the leaf spring 123 is confined within a pair of spaced walls 124. A backing member 125 attached to the spaced walls 124 also tends to confine the helical portion of the leaf spring 123. The leaf spring 123 urges the cassettes forwardly in the station.

The leaf spring is attached to a post 127 at the forward end of the station 120. A ramp 129 pivotable as at 131 abuts the forward periphery of the forward one of the cassettes in the station 120. The ramp 129 is biased upwardly by a compressed spring 133. The ramp 129 is depressed by a pivotal movement on the pin 131 against the action of the spring 133 when additional ones of the slave cassettes 28 are loaded into the station 120 from the forward end of the cassette.

The forward cassette 28 in the station 120 is pivoted through an arc indicated in broken lines at 122 (FIG. 2) to a position or station 28c corresponding to the station 21c for the master cassette. It will be appreciated that this pivotal movement is through an angle such as 165° for the slave cassette 28 as distinguished from a pivotal movement of the master cassette 10 through an angle such as approximately 75°. At the position or station 28c, an initial threading operation is provided corresponding to the initial threading provided on the cassette 21 at the station 21c. In other words, the slave tape 12 is moved from the position inside the cassette 28 to a position above the guide 68, the heater 70 and the capstan 72 with the pinch roller 50 displaced from the capstan.

The slave cassette 28 is then pivoted to the position 28b corresponding to the position shown at 21b for the master tape 10. The pivoting occurs through an arc indicated schematically at 126 in FIG. 2. At this station, the master cassette 21 is perpendicular to the pinch roller 50 and the slave cassette 28 is perpendicular to the capstan 72. After the image on the master tape 10 has been transferred to the slave tape 12 at the position 28b, the slave cassette 28 is transferred to a position or station 28c and the slave tape 12 is removed from the guide 68, the heater 70 and the capstan 72 and causes the slave tape 12 to be returned to a disposition entirely within the cassette 28. The slave cassette is then transferred into a station generally indicated at 250 in FIG. 2.

As will be seen in FIG. 3, the slave cassette 28 has a groove 130. This groove is disposed at a forward periphery of each of the slave cassettes 28 in the station 120. As shown in FIG. 3, a spring clip 132 is disposed in the groove 130 in the forward one of the cassettes 28 in the station 120. A retaining pin 134 extends into the groove 130 in the forward periphery of the next one of the slave cassettes 28 in the station 120 and grips the rear periphery of the forward one of the cassettes. The spring clip 132 and the retaining pin 134 retain the forward one of the slave cassettes as the slave cassette is pivoted to the different positions or stations shown in FIG. 2. Although only one spring clip 132 and one retaining pin 134 are shown in FIG. 3, two (2) spring clips 132 and two (2) retaining pins 134 are actually provided (FIG. 15) to grip the forward one of the slave cassettes 28 at different heighths on the slave cassette. This will be described in detail subsequently.

When the slave cassette 28 is in the position or station 28c, it engages a plate 136 (FIGS. 7 and 8) corresponding to the plate 90 (FIG. 8b) for the master tape. The plate 136 contains threading arms 138 and 140 respectively corresponding to the threading arms 92 and 94 for the master tape 10. The threading arms 138 and 140 are respectively pivotable on pins 142 and 144. Pins 146 and 148 are respectively provided at the ends of the threading arms 138 and 140. The pins 146 and 148 engage the slave tape 12 inside the slave cassette 28 in the retracted position of the threading arms shown in FIG. 7. The threading arms 138 and 140 are pivoted synchronously as by meshing gears 150 and 152 driven by a motor 154.

The plate 136 also contains the dancer arm 78. The threading arm 140 engages a lug 156 on the dancer arm 78 to drive the dancer arm from the position shown in FIG. 7 to the position shown in FIG. 8 as the threading arm is pivoted by the motor 154 from the position shown in FIG. 7 to the position shown in FIG. 8. The dancer arm 78 is pivotable on a pin 158 at one end of the threading arm. A suitable constrainable member such as a helical spring 161 becomes constrained when the dancer arm 78 becomes pivoted from the position shown in FIG. 7 to the position shown in FIG. 8. The constrained spring 160 returns the dancer arm 78 to the position shown in FIG. 7 when the motor 154 returns the threading arms 138 and 140 to the positions shown in FIG. 7 from the positions shown in FIG. 8.

Figure 7:
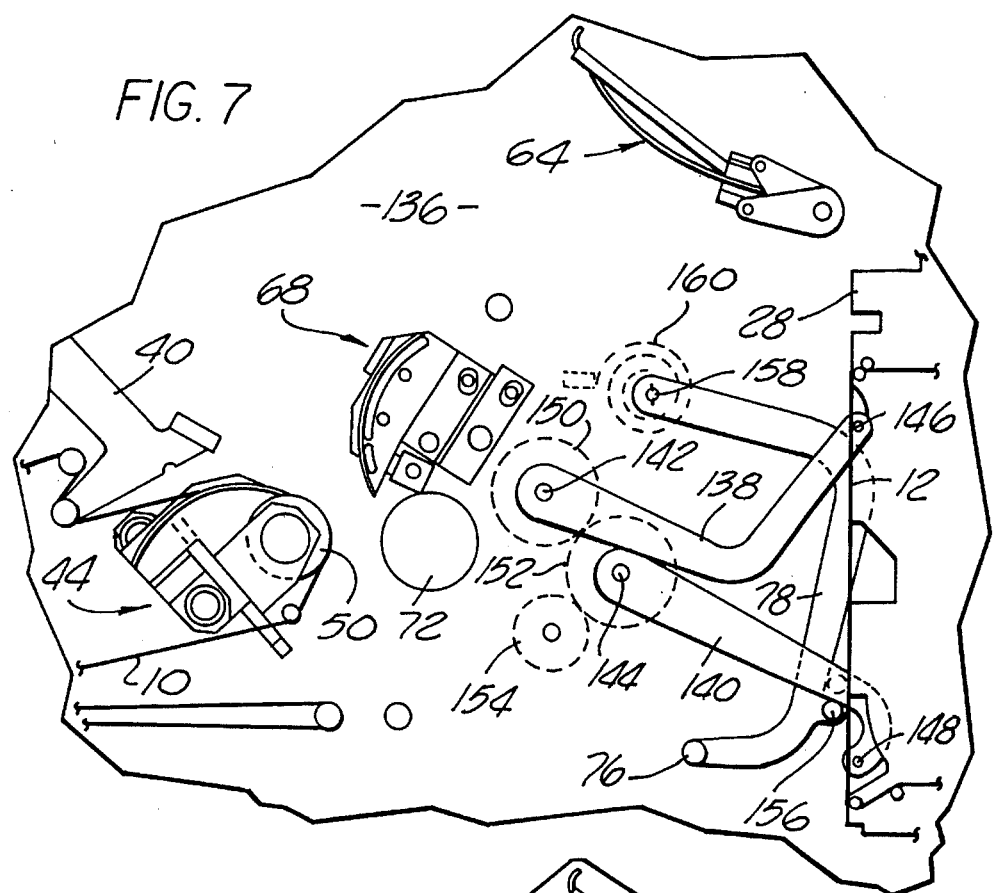
FIG. 7 is an enlarged fragmentary view of threading and dancer arms for the slave cassette in retracted positions at the second (threading) station with the slave tape still in the slave cassette and with the threading arms engaging the slave tape in the slave cassette.

The threading arms 138 and 140 and the dancer arm 78 are in the positions shown in FIG. 7 when the slave cassette 28 reaches the position 28c after being withdrawn from the station 120 and pivoted from the position or station 28a to the position or station 28c. The position or station 28c corresponds to the 15° position or station of the slave cassette. At this station, the threading arms 138 and 140 are rotated from the position shown in FIG. 7 to the position shown in FIG. 8. The threading arm 140 in turn drives the dancer arm 78 from the position shown in FIG. 7 to the position shown in FIG. 8. FIG. 8A shows the slave tape 12 partially extended in the 15° position or station. FIG. 8B shows the slave tape 12 in the fully extended position.

Figure 8:
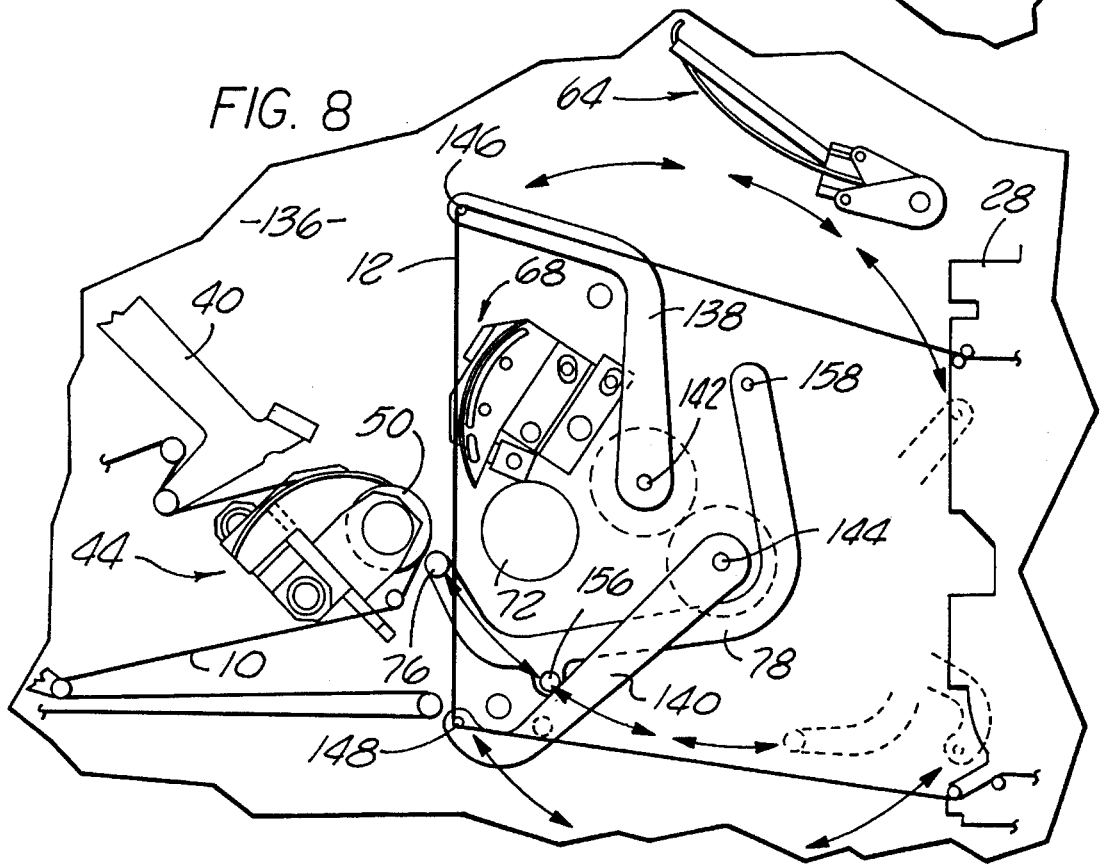
FIG. 8 is an enlarged fragmentary view similar to that shown in FIG. 7 and shows the threading and dancer arms for the slave cassette in extended positions at the third image transfer station with the slave tape raised over a capstan, a heater and a guide to become disposed on the capstan, the heater and the guide when the threading and dancer arms are returned to their retracted positions.
Figure 8A:
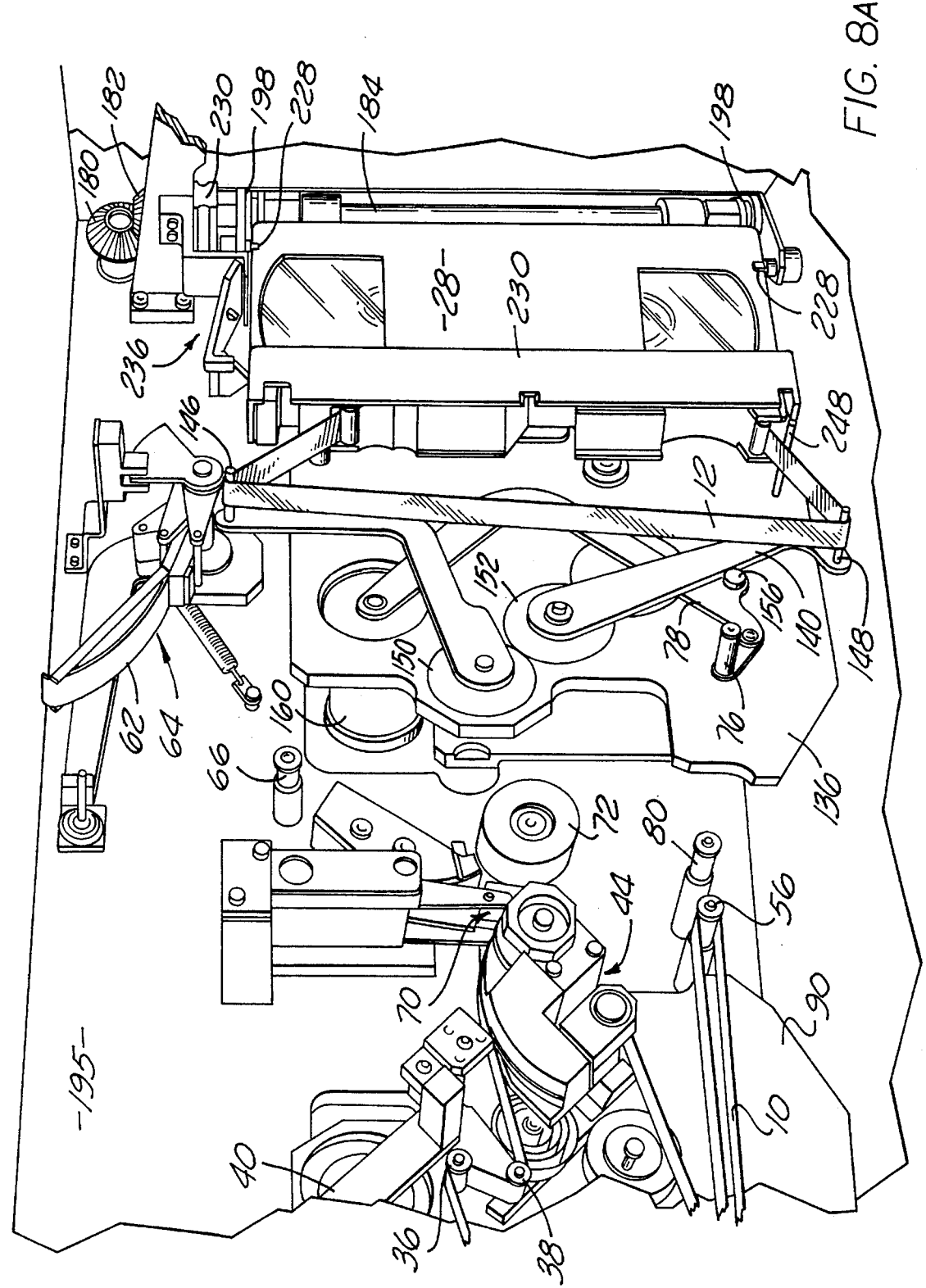
FIG. 8A is a perspective view of the apparatus shown in FIG. 1 and shows the slave tape and the threading and dancer arms for the slave tape at the second (threading) station when the threading arms and the dancer arms are moved partially from their retracted positions to their extended positions.
Figure 8B:
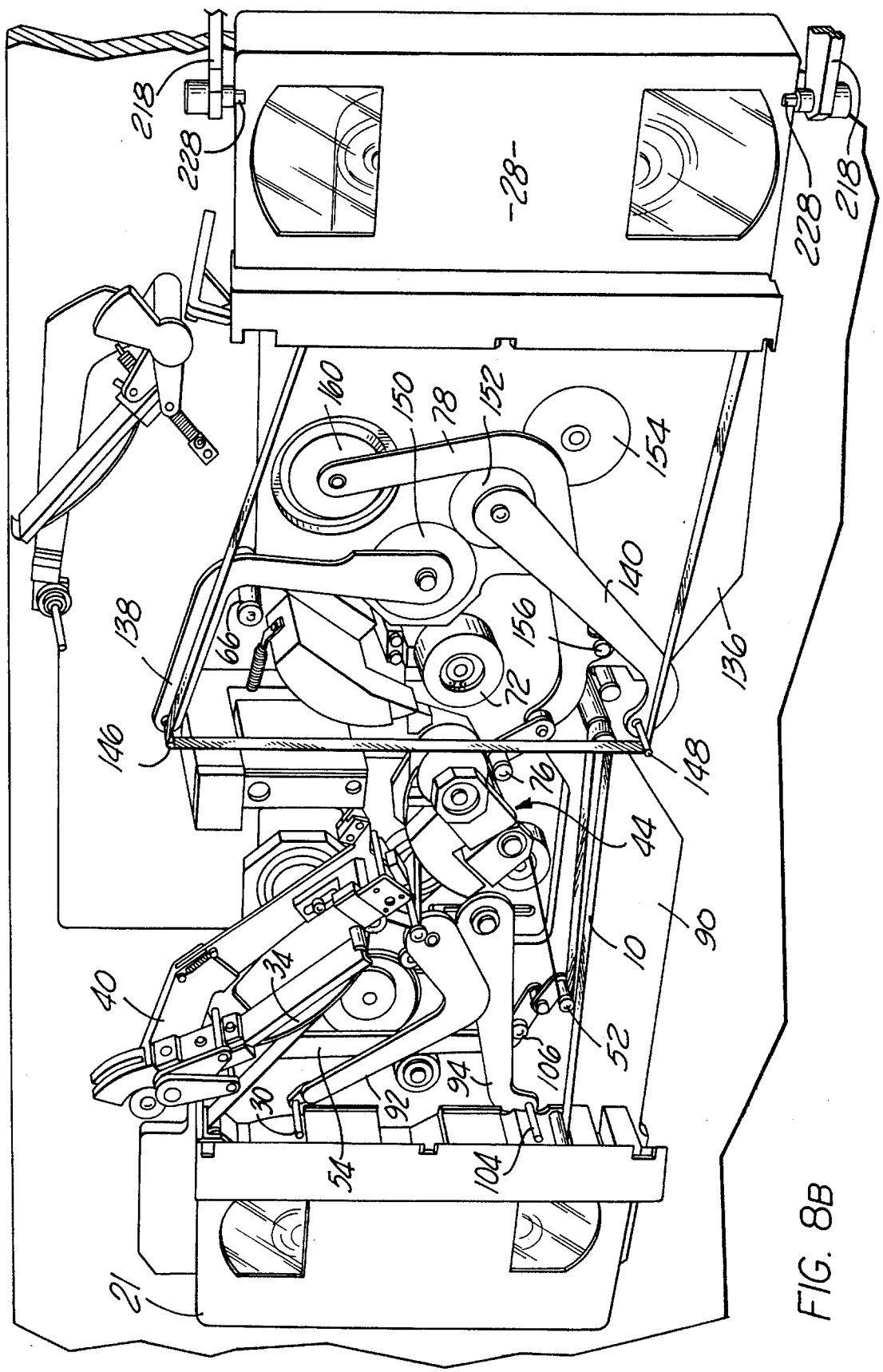
FIG. 8B is a perspective view of the apparatus shown in FIG. 1 and shows the slave tape and the threading arms and the dancer arm for the slave tape at the third (image transfer) station when the threading arms and the dancer arm are disposed to the fully extended position corresponding to that shown in FIG. 8.
Figure 9:
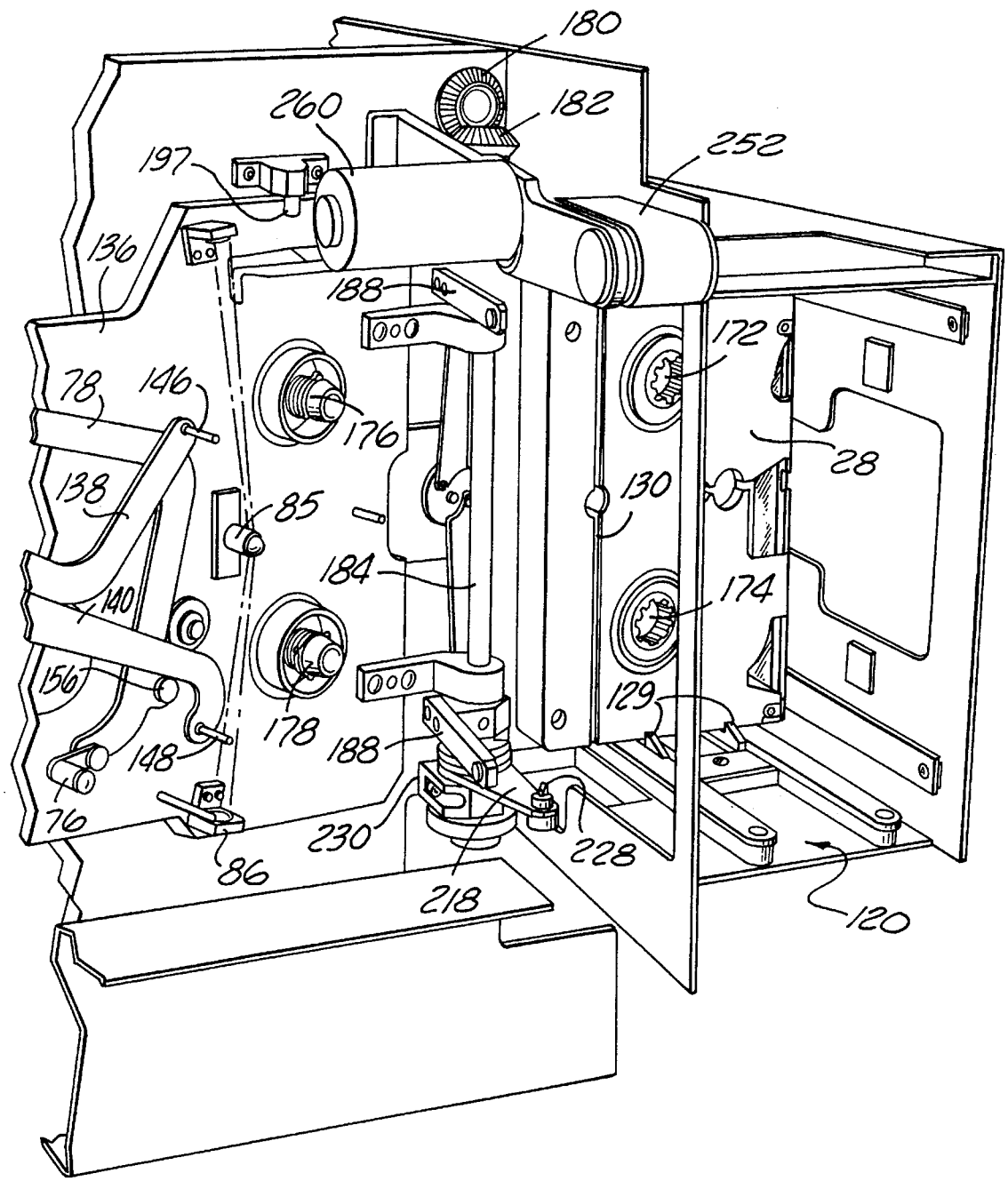
FIG. 9 is a perspective view of the threading station and of the first (supply) station before the removal of the forward one of the slave cassettes from the first (supply) station for movement to the second (threading) station.

In the position shown in FIG. 8, the slave tape 12 is disposed over guide 68, the heater 70 and the capstan 72. The plate 136 is moved to the station 28b (the 0° position) for the slave tape 12 after the tape has been extended to the position shown in FIG. 8. At this station, the threading arms 138 and 140 are retracted to the position shown in FIG. 7. This causes the dancer arm 78 to be retracted to the position shown in FIG. 7. In these positions of the threading arms 138 and 140 and the dancer arm 78, the slave tape 10 has the path shown in FIG. 1 with the slave tape being disposed on the guide 68, the heater 70 and the capstan 72. At the same time that the threading arms 138 and 140 and the dancer arm 78 are retracted to the positions shown in FIGS. 1 and 7, the articulator 64 is moved from the position shown in FIGS. 7 and 8 to the position shown in FIG. 1.

The slave cassette 28 is pivoted to the different positions shown in FIG. 3 as by an arm 160 pivotable on a pin 162. The arm 160 is shown in FIG. 3 in a first position 160a corresponding to the position or station 28a for the slave cassette 28 and in a position 160c corresponding to the position or station 28c for the slave cassette. As will be seen in Figures subsequent to FIGS. 7 and 8, the arm 160 is mechanically coupled to an arm which drives the spring clip 132 with the arm 160 to rotate the slave cassette 28 from the position or station 28a to the position or station 28c.

A roller 164 (FIGS. 3 and 4) is disposed against the back side of the plate 136. The roller 164 is disposed at the end of an arm 166 pivotable at its opposite end on a pin 168. A constrainable member such as a helical spring 170 is disposed on the pin 168 so as to become constrained as the plate 136 is moved from the 15° position (shown in solid lines in FIG. 4) to the 0° position (shown in broken lines in FIG. 4). As the spring 170 becomes constrained, it exerts a force against the plate 136 to provide a controlled movement of the plate 136 to the 0° position. In the 0° position, the image on the master tape 10 is transferred to the slave tape 12. After the image on the master tape 10 has been transferred to the slave tape 12 and the plate 136 is returned to the 15° position (the position or station 28c) for the slave cassette 28, the spring 170 operates to move the plate 136 to the 15° position.

Figure 11:
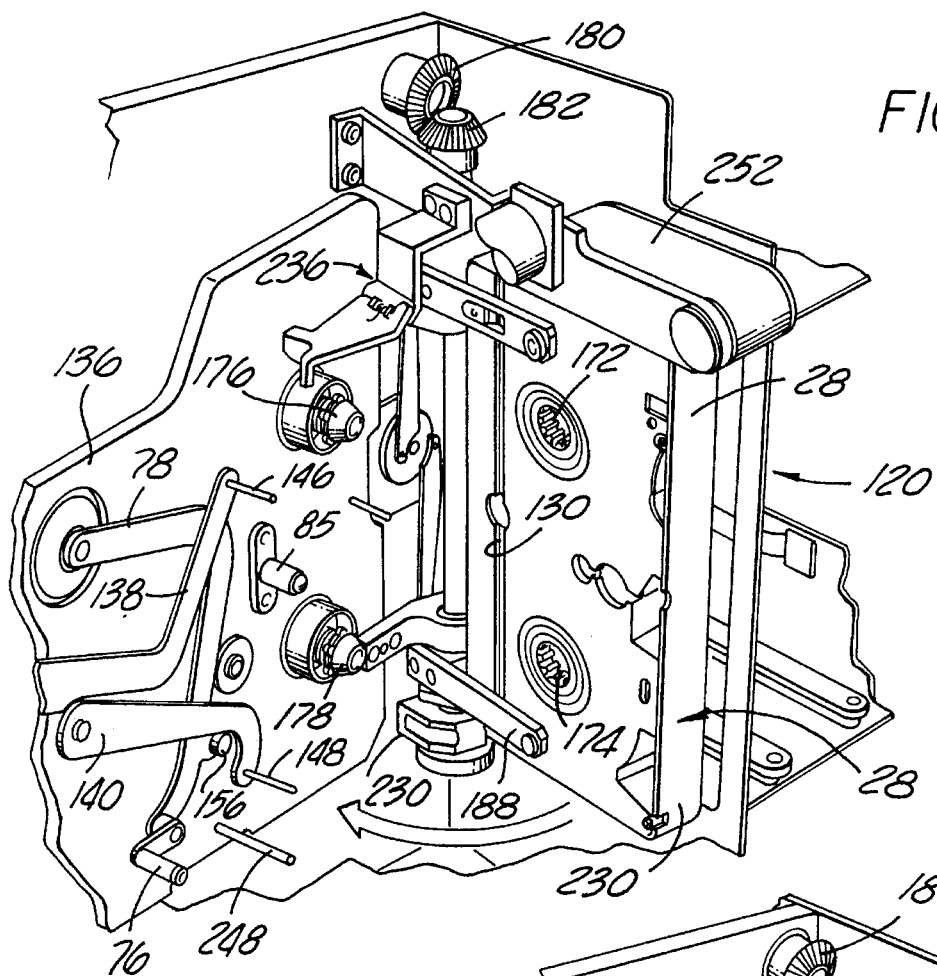
FIG. 11 is a schematic fragmentary perspective view illustrating the disposition of the slave cassette during the pivotal transfer of the slave cassette from the first (supply) station to the second (threading) station and further illustrating apparatus for facilitating such transfer.

As shown in FIG. 11, the slave cassette 28 has a socket 172 concentric with the supply reel 22 and a socket 174 concentric with the take-up reel 24. Each of the sockets 172 and 174 is splined respectively to receive mating cylinders 176 and 178 on the plate 136 in the 15° position of the plate. The mating cylinder 178 is driven by the take-up motor 26 in FIG. 1 when the plate 136 is pivoted to the 0° position (the position 28b of the slave cassette 28) in FIGS. 2, 3 and 4.

After the image on the master tape 10 has been transferred to the slave tape, the threading arms 138 and 140 and the dancer arm 78 (FIGS. 1, 7 and 8) are pivoted from the retracted position shown in FIG. 7 to the extended position shown in FIG. 8. This causes the slave tape 12 to become displaced from the guide 68, the heater 70 and the capstan 72. The plate 136, the threading arms 138 and 140 and the dancer arm 78 are then moved with the slave cassette 28 to the 15° position or station. The threading arms 138 and 140 and the dancer arm 78 are then moved from the extended position shown in FIG. 8 to the retracted position shown in FIG. 7. In this relationship, the slave tape 12 becomes released from the threading arms 138 and 140 and the dancer arm 78 and becomes disposed entirely in the slave cassette 28 as shown in FIG. 7.

As previously described, the slave cassettes 28 are initially located in a supply station 120 (indicated by the slave cassette 28a in FIG. 2) and are moved to the 15° station indicated schematically at 28c in FIG. 2. The rotation is provided by a gear 180 (FIG. 17) which drives a bevel gear 182 mounted on a support member 195. The bevel gear 182 in turn drives a shaft 184 on which is mounted the arms holding the spring clips 132 (also shown in FIG. 3). As previously described, the spring clips 132 are seated in the groove 130 (FIG. 3) at the forwardly facing periphery of the forward one of the slave cassettes 28 in the station 120. Each of the arms holding the spring clips 132 is formed by a block 186 (FIG. 17A) to which is attached as by bolts 187 a plate 188 holding one of the spring clips 132. A slot 190 is provided in the block 186 at a position adjacent the plate 188.

A bracket 192 (FIG. 17A) is disposed on a bearing 194 which is mounted on the shaft 184. The bracket 192 is attached as by bolts 196 to the plate 136. A bracket 193 (FIG. 15) is mounted on a support member 195 and is provided with a lug 197 which overhangs the plate 136 and prevents the plate from moving past the 15° station (the position 28c of the slave cassette 28 in FIG. 2) toward the 180° position (the position 28a of the slave cassette 28 in FIG. 2). This causes the plate 136 to be movable only between the 15° position (the position 28c of the slave cassette 28 in FIGS. 2 and 3) and the 0° position (the position 28b of the slave cassette 28 in FIG. 2).

Figures 15, 16, 16A:
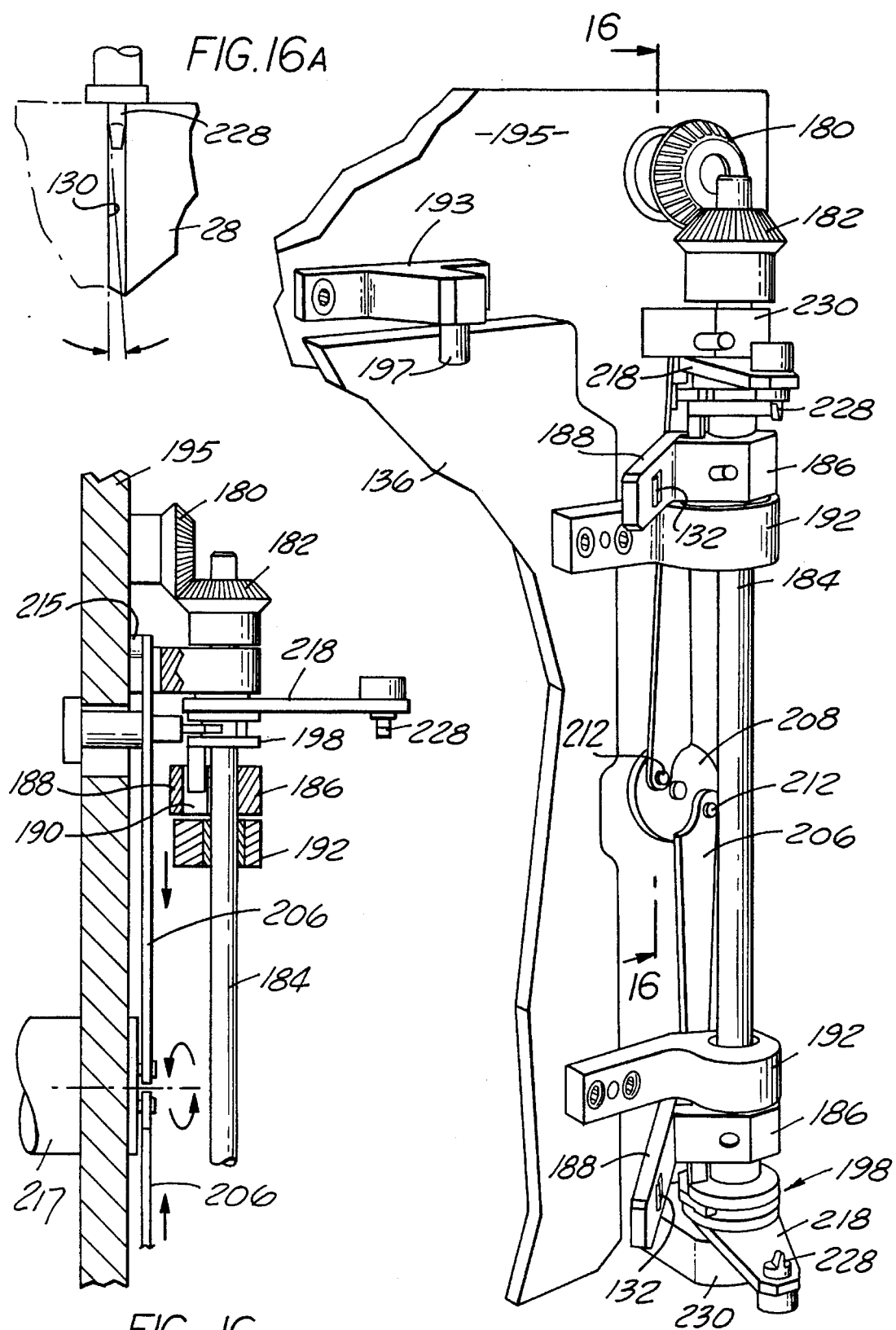
FIG. 15 is a perspective view of the apparatus for gripping the slave cassette in the first station and moving the slave cassette to the different stations.
FIG. 16 is a fragmentary sectional view taken substantially on the line 16—16 of FIG. 15 and illustrates in additional detail the construction of the apparatus for gripping the slave cassette in the first station and moving the slave cassette to the different stations.
FIG. 16A is a fragmentary schematic elevational view of the forward slave cassette and the next slave cassette in the first station and of a finger disposed between the forward and next cassettes for gripping the forward cassette in the first station.
Figure 17:
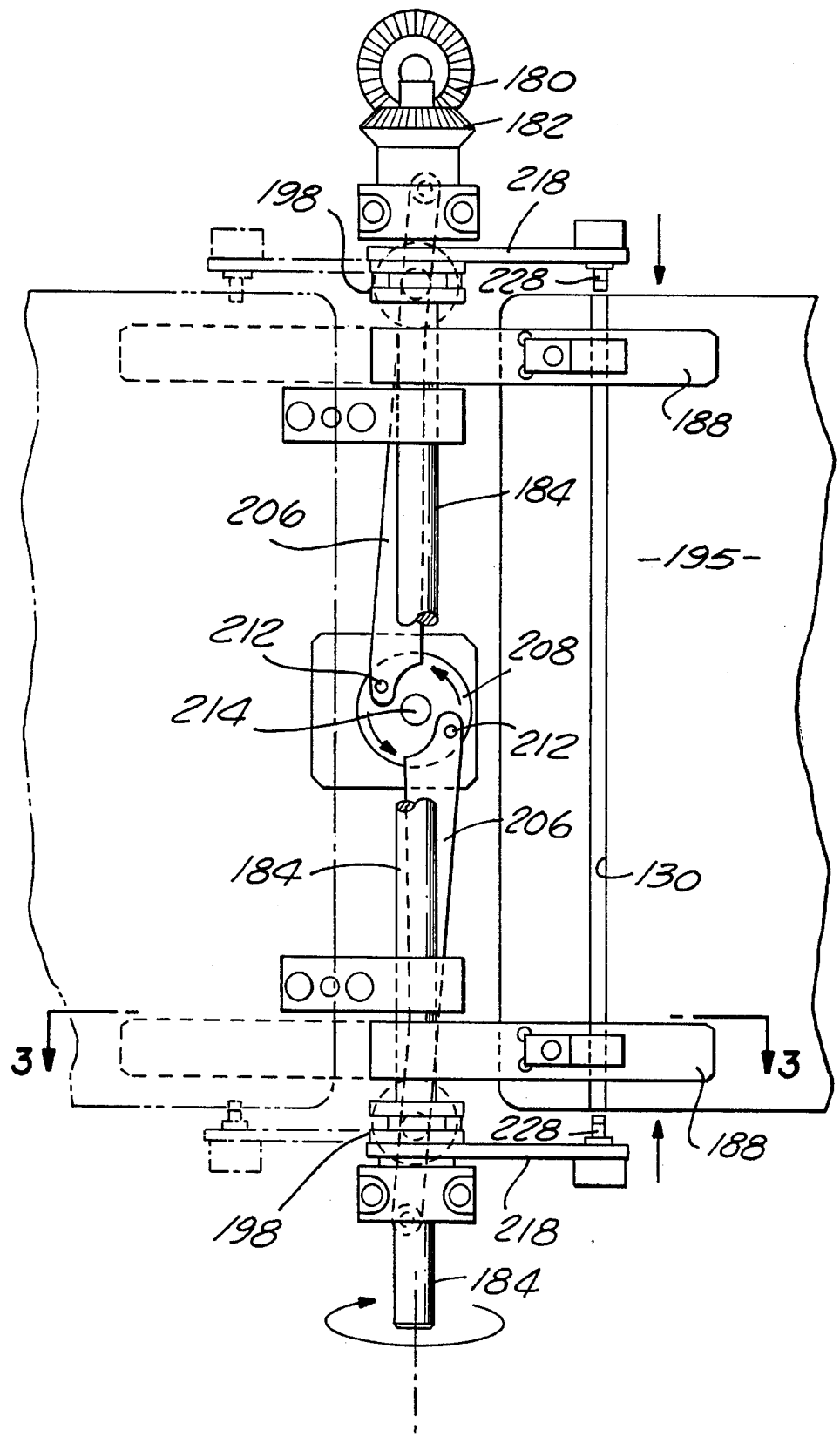
FIG. 17 is an elevational view of the apparatus shown in FIGS. 15, 16 and 16A for gripping the forward one of the slave cassettes in the first station and moving the slave cassette to the different stations.
Figure 17A:
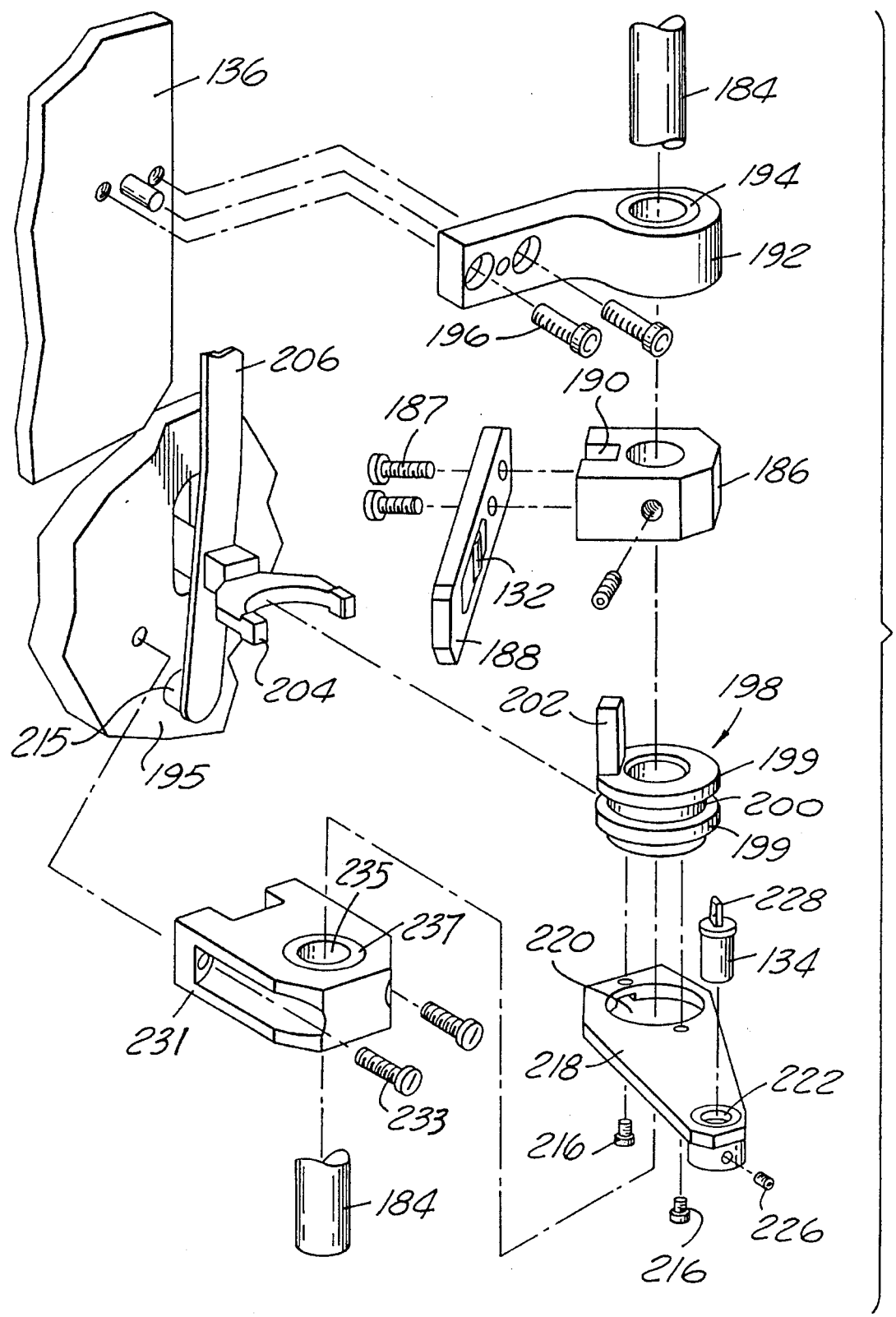
FIG. 17A is an exploded perspective view of the apparatus shown in FIGS. 15–17 for gripping the forward one of the slave cassettes in the first (supply) station and for moving such slave cassette from the first (supply) station.

A pair of clevises generally indicated at 198 (FIGS. 15, 16, 17 and 17A), each defined by two (2) spaced discs, 199 with a groove 200 between the discs is also mounted on the shaft 184. A tyne 202 extends vertically from one of the discs in each clevis 198 into the slot 190 in the block 186 to move the block and the plate 188 rotationally with the clevis. Forked members 204 are disposed in the grooves 200 in the clevises 198 with the legs of each fork enveloping the associated groove. The forked members 204 are mounted on rods 206 each of which is movable vertically in accordance with the rotary movements of a crank 208 (FIGS. 15 and 17). The crank 208 is mounted on the support member 195. As may be seen in FIGS. 15 and 17, the crank 208 has a pair of pins 212 one of which engages the upper one of the rods 206 and the other one of which engages the lower one of the rods. The crank 208 is rotatable on a pin 214. Each of the rods 206 has a button 215 (FIG. 17A) which moves on the support member 195 (FIGS. 15 and 17A) in accordance with the rotation of the crank 208. The crank 208 is driven by a motor 217 in FIG. 16.

Each of the clevises 198 is attached as by bolts 216 (FIG. 17A) to a support member 218. The support member 218 has a socket 220 which receives the clevis 198. The support member 218 also has a socket 222 which receives one of the pins 134 (also shown in FIG. 3). The pin 134 is fixedly positioned relative to the support member 218 as by a set screw 226. Each of the pins 134 has a finger 228 which is disposed in the groove 130 (FIG. 3) in the forward periphery of the next one of the slave cassettes 28 in the station 120. The finger 228 may be tapered. The finger 228 engages the rearward periphery of the forward one of the slave cassettes 28 in the station 120. Support members 231 (FIG. 17A) are disposed at the top and bottom of the shaft 184 and are suitably attached as by bolts 233 to the support member 195. The shaft 184 extends through a hole 235 in each of the support members 230. A bearing 237 is disposed between the shaft 184 and each of the support members 230.

When the crank 208 is rotated in a counterclockwise direction on the pin 214 as shown by the arrows in FIG. 17, one of the pins 212 on the crank in FIG. 17 drives the upper rod 206 downwardly and the other pin 212 on the crank drives the lower rod 206 upwardly. The upper one of the forked members 204 (FIG. 17A) moves downwardly with the associated rod 206 and drives the upper clevis 198 downwardly. This causes the finger 228 on the associated one of the pins 134 to become disposed in the top of the groove 130 in the next one of the slave cassettes 28 in the supply station 120 and to grip the forward one of the slave cassettes at the rear periphery of the slave cassette.

In like manner, the lower one of the forked members 204 moves upwardly with the associated rod 206 and drives the lower clevis 198 upwardly. This causes the associated finger 228 on the associated one of the pins 134 to become disposed in the bottom of the groove 130 in the next one of the slave cassettes 28 in the supply station 120 and to grip the forward one of the slave cassettes at the rear periphery of this slave cassette. Since the forward periphery of the forward one of the slave cassettes 28 in the supply station 120 is also gripped at its upper and lower positions by the spring clips 132 (FIG. 3), the forward one of the slave cassettes 28 is firmly held at its forward and rear peripheries and is able to be pivoted from the supply station 120 (the 180° position) to the position 28c (the 15° position) in FIGS. 2 and 3 and the position 28b (the 0° position) in FIGS. 2 and 3.

Each of the slave cassettes 28 has a spring loaded cover 230 (FIGS. 18–20) which is disposed over the slave tape 12 in the cassette. The spring-loaded cover 230 is conventional in tape cassettes now on the market. As the slave cassette 28 moves from the supply station 120 (the 180° position) toward the threading station (the 15° position), the spring loaded cover 230 becomes opened by the mechanism shown in FIGS. 18–20. The opening of the cover 230 is initiated by the depression of a button 232 on the top peripheral surface of the slave cassette 28. A lug 234 on a bracket 236 depresses the button 232 as the slave cassette 28 swings past the lug. The bracket 236 is supported as by bolts 238 on the support member 195.

As the slave cassette 28 continues to move toward the 0° position, a pawl 240 at the end of an arm 242 engages the cover 230 and opens the cover to expose the slave tape 12. The arm 240 is pivotable as at 244 on the bracket 236. The pawl 240 is tapered as at 246. The pivotable relationship of the arm 242 and the taper 246 at the bottom of the pawl 240 causes the pawl to ride upwardly as the slave cassette 28 moves toward the 15° position or station, thereby providing for the continued movement of the slave cassette 28 toward the 15° position. When the slave cassette 28 reaches the 15° position or station, a pin 248 at the bottom of the plate 136 holds the cover 230 open to provide for the disposition of the slave tape on the capstan 72, the heater 70 and the guide 68 and the subsequent transfer of the image on the master tape 10 to the slave tape 12.

After the image on the master tape 10 has been transferred to the slave tape 12, the slave cassette 28 holding the slave tape 12 is transferred from the 0° station to the 15° station. At the 15° position, the threading arms 138 and 140 and the dancer arm 78 are retracted to the position shown in FIG. 7. The slave cassette is then pivoted to a receiving station generally indicated at 250 in FIGS. 21–28. The receiving station 250 is disposed at a 90° position relative to the supply station 120 at the 180° position and the image transfer station at the 0° position.

At the receiving station 250, the slave cassette 28 is transferred between a pair of belts 252 (FIGS. 21 and 23) movable in the 90° direction. The belts are initially displaced by a distance greater than the height of the slave cassette 28 so that the slave cassette 28 can be easily disposed between the belts. The belts 250 are disposed on a pair of spaced pulleys 254 (FIG. 23) so that the belts can be rotatable in a closed loop in the 90° direction. The pulleys 254 are in turn disposed within a pair of pulleys 256, one of the pulleys in each pair driving the other as by a belt 258.

Figure 23:
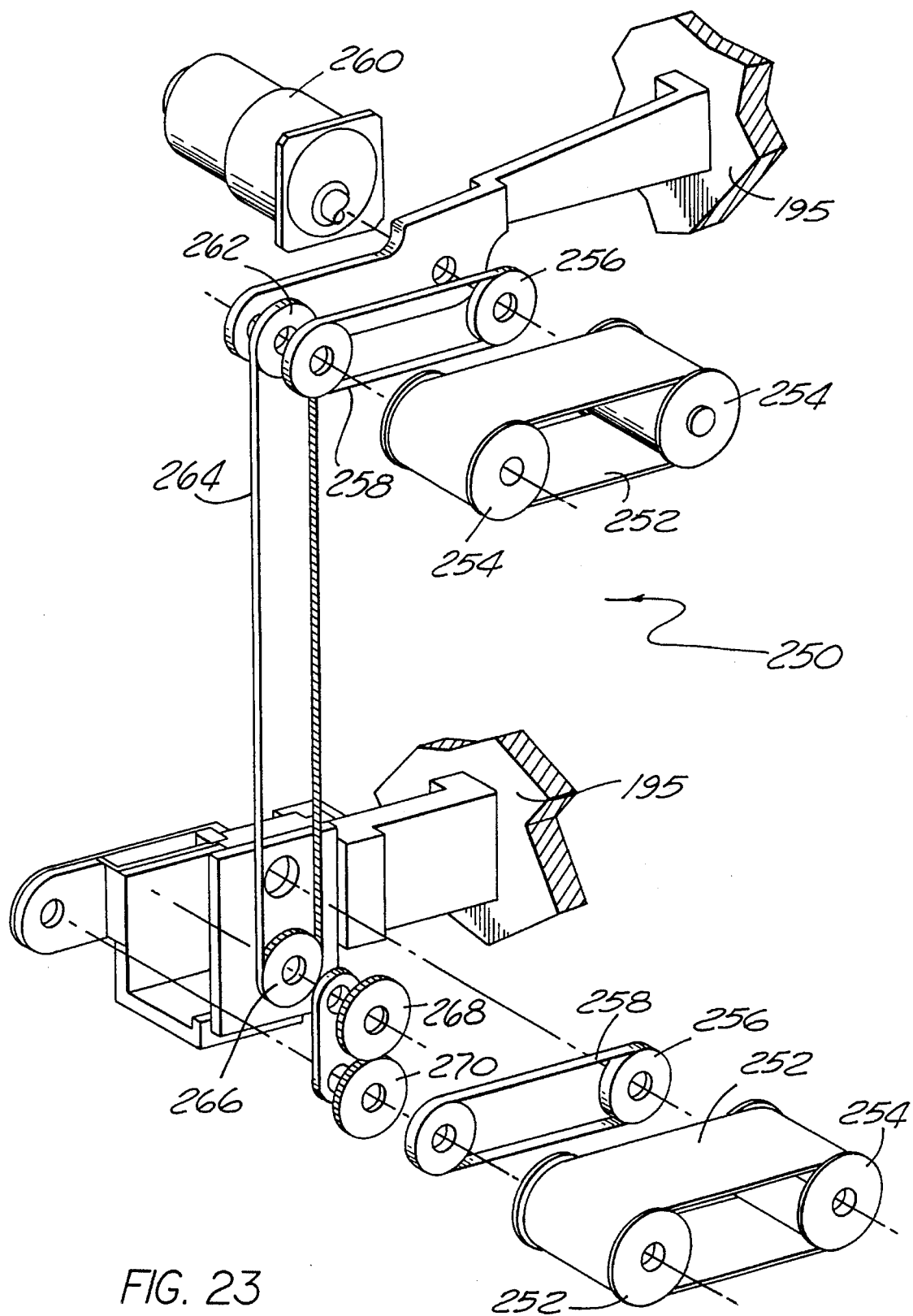
FIG. 23 is an exploded perspective view of the apparatus shown in FIGS. 21 and 22.

A motor 260 (FIG. 23) drives one of the pulleys 256 in the upper pair. A pulley 262 is rotatable with the other pulley 256 in the upper pair. The pulley 262 drives an endless belt 264 which in turn drives a pulley 266. Gears 268 and 270 are in turn driven by the pulley 266. The gear 270 is coupled to one of the pulleys 256 in the lower pair. With the belts 252 disposed as shown in FIG. 23, the distance between the belts 252 is greater than the height of the slave cassette 28 to facilitate the transfer of the slave cassette to the position between the belts for transport by the belts.

Figures 21, 22:
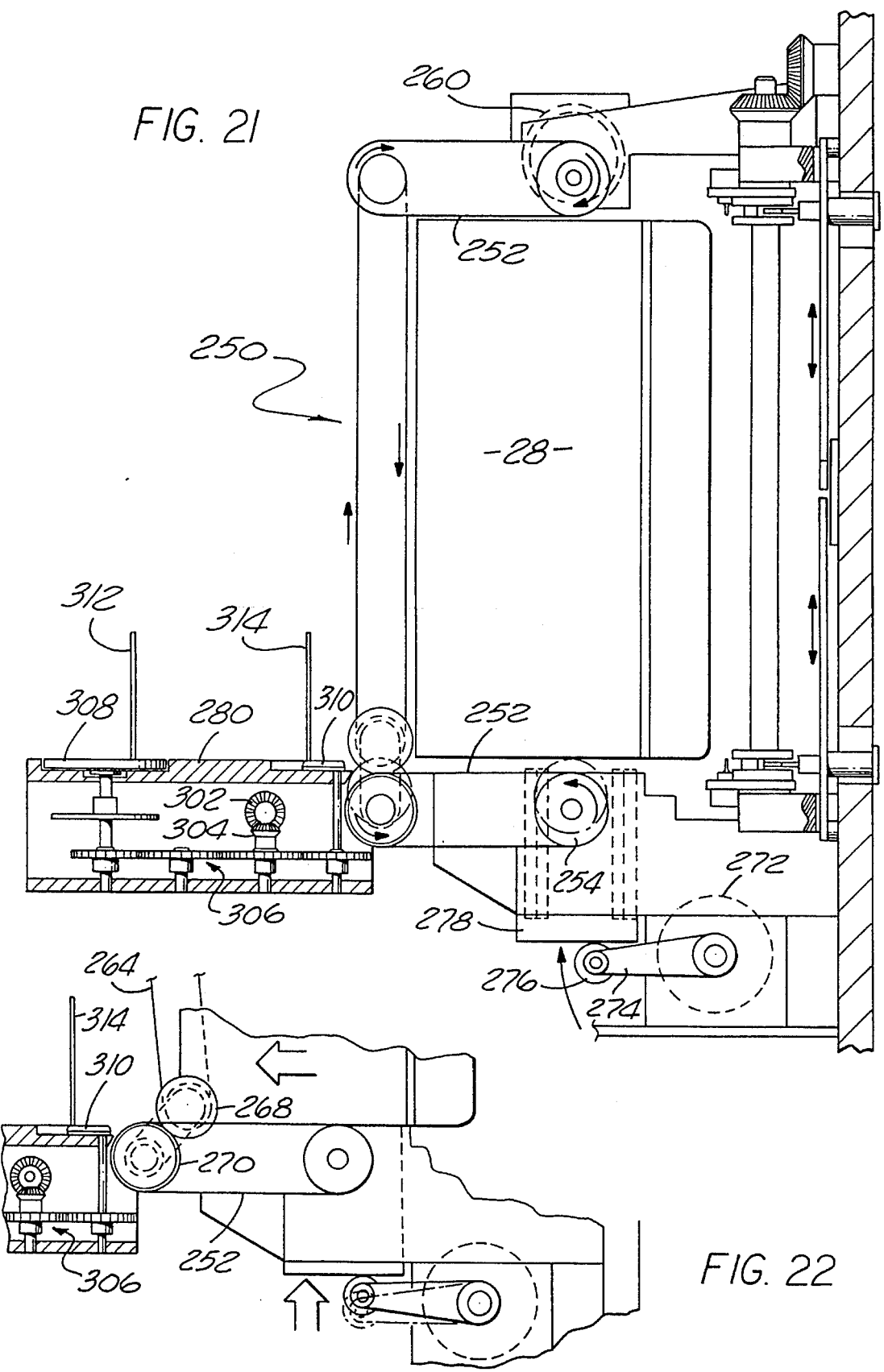
FIG. 21 is an elevational view taken substantially on the line 21—21 of FIG. 2 and illustrates the construction in additional detail of the station (the fourth station) for receiving the slave cassettes after the image on the master tape has been transferred to the slave tapes in such cassettes.
FIG. 22 is a fragmentary elevational view similar to that shown in FIG. 21 and illustrates certain features shown in FIG. 21 in a different position than that shown in FIG. 21.

After the slave cassette 28 has been transferred between the belts 250, a solenoid 272 in FIG. 21 is energized. This causes an arm 274 mounted concentrically on the solenoid to rotate in a counterclockwise direction in FIG. 21. At its free end, the arm 274 has a roller 276 which engages a shelf 278 on which the pulley 266 is mounted. The pivotal movement of the arm 274 in the counterclockwise direction causes the shelf 278 to rise so that the lower one of the belts 252 engages the bottom surface of the slave cassette 28.

The lowered position of the bottom belt 252 is shown in solid lines in FIG. 21 and the raised position of the belt is shown in broken lines in FIG. 21. The raised position of the bottom belt 252 is shown in solid lines in FIG. 22. When the belt is raised to the position shown in FIG. 22, the belt 264 becomes tilted because the gears 268 and 270 change from the vertical relationship shown in FIG. 23 to the skewed relationship shown in FIG. 22.

After the lower belt 252 has become raised to the position shown in FIG. 22, the support members 218 (FIG. 17A) are moved vertically so that the distance between the upper and lower fingers 228 is increased. This causes the fingers 228 to be removed from the rear peripheral surface of the slave cassette 28. Even though the fingers 228 become removed from the rear peripheral surface of the slave cassette 28, the slave cassette is retained firmly in position between the belts 252 in FIG. 23. The slave cassette 28 is then rotated through a relatively small angle such as a few degrees (e.g. 4°) toward the 0° position by the rotation of the gears 180 and 182 (FIG. 16). This allows the spring clips 132 to slip out of the grooves 130 in the slave cassette 28 so that the slave cassette 28 is retained only by the belts 252.

Figure 27:
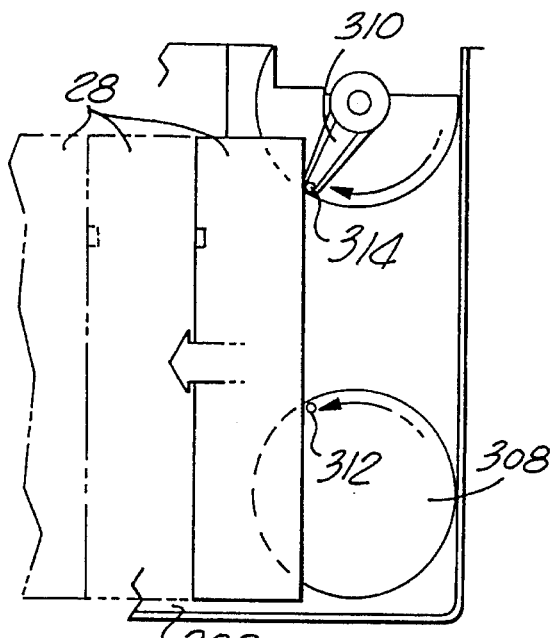
FIG. 27 is a fragmentary plan view similar to shown in FIGS. 25 and 26 and schematically illustrates the members, at an advanced position in transferring the slave cassette into the fourth (receiving) station.
Figure 28:
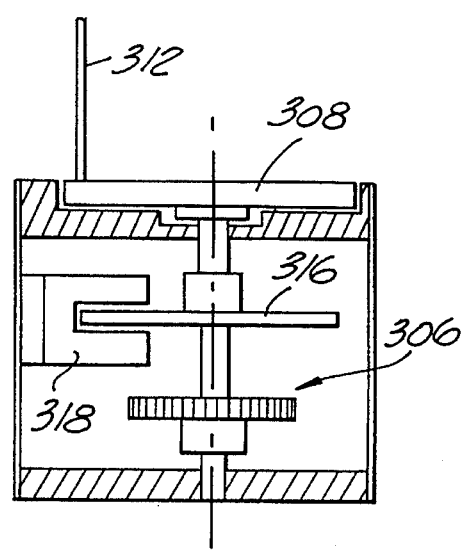
FIG. 28 is a sectional view taken substantially on the line 28—28 of FIG. 25 and illustrates in additional detail the construction of certain of the members shown in FIGS. 25-27.

After the slave cassette 28 has been transferred to the belts 252 by raising the lower one of the belts, the motor 260 (FIG. 23) is operated to move the belts in a direction (see the arrow 281 in FIG. 25) for transferring the slave cassette to a platform 280 (FIG. 21) laterally displaced from a compartment 282 (FIG. 27) included in the station. As shown in FIG. 27, the slave cassettes 28 having a copy of the image from the master tape 10 are disposed in a stacked relationship in the compartment 282.

Figure 24:
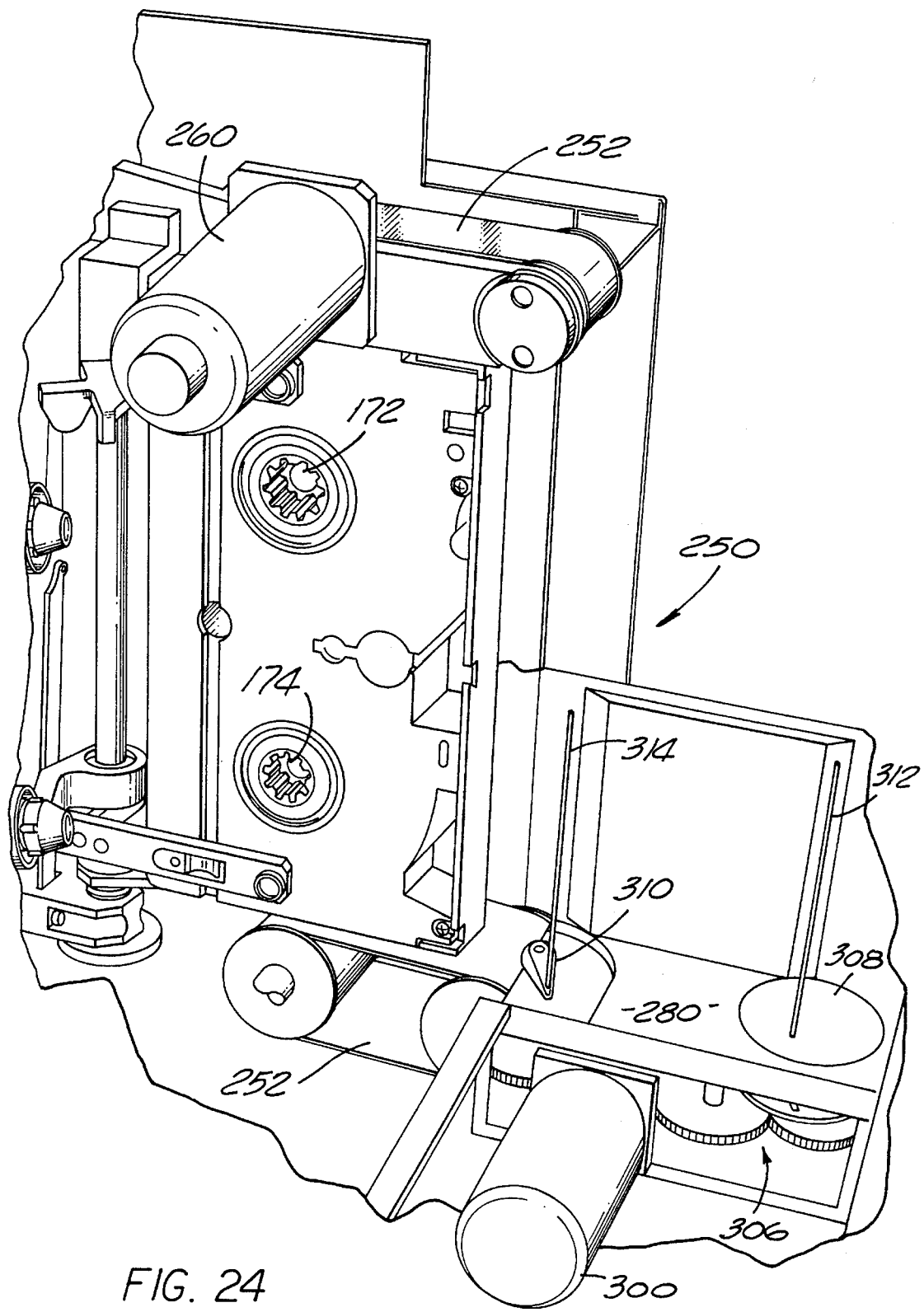
FIG. 24 is a perspective view of the apparatus shown in FIGS. 21–23 and illustrates the position of a slave cassette as the slave cassette is being transferred into the fourth (receiving) station.

The mechanism for transferring the slave cassette 28 into the compartment 282 is shown primarily in FIGS. 21 and 24–28. The mechanism includes a motor 300 (FIG. 24) which drives a gear 302 (FIG. 21). The gear 302 is in mesh with a bevel gear 304 which drives a gear train generally indicated at 306 (FIGS. 21 and 24). A disc 308 (FIG. 24) is driven by one of the gears in the gear train 306 and a member 310 in the form of a segment of a cylinder is driven by another one of the gears in the gear train 306. A drive pin 312 is disposed on the periphery of the disc 308 and a drive pin 314 is disposed on the periphery of the disc segment 310. A disc 316 (FIG. 28) is disposed on the same shaft as the disc 308 to sense the light from a source 318 schematically shown in FIG. 25. The sensing is provided to insure that the drive pin 312 is in proper rotary position when the slave cassette 28 is transferred into the compartment 282.

When the slave cassette 28 has been transferred to the compartment 282, the bottom belt 252 (FIG. 23) is lowered. This is partly to position the bottom belt 252 so that the pin 314 (FIG. 24) can be moved by the drive pins 310 into the compartment 282. The rotation of the drive pins 312 and 314 is shown by arrows in FIG. 25. As will be seen in FIG. 25, the rotation of the disc segment 310 is in a clockwise direction and the rotation of the disc 308 is in a counter-clockwise direction.

Figure 25:
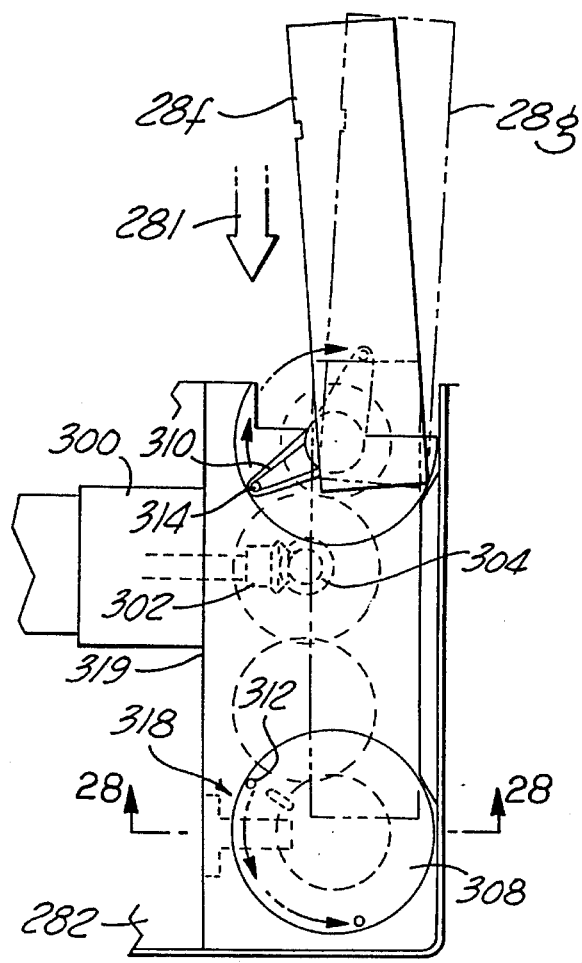
FIG. 25 is a fragmentary plan view of members for transferring the slave cassette into the fourth (receiving) station after the slave cassette has reached the fourth (receiving) station, the members being shown in a first position for initiating the transfer of the slave cassette into the fourth station.

When the slave cassette 28 reaches the platform 280, the drive pins 312 and 314 are substantially in the positions shown in FIG. 25. The drive pins 312 and 314 are then rotated to the positions shown in FIG. 26. In these positions, the drive pins 312 and 314 engage the rear peripheral surface of the slave cassette 28 at the opposite ends of this peripheral surface. As the drive pins 312 and 314 continue to rotate from the position shown in FIG. 26 to the position shown in FIG. 27, they drive the slave cassette 28 from the platform 280 into the compartment 282 through a mouth 318 through a mouth 319 in the compartment. As will be seen in FIGS. 24 and 25, the mouth 319 of the compartment 318 is substantially parallel to, but displaced from the belts in the direction of movement of the belts. In this way, the belts 252 initially displace the slave cassettes in a direction parallel to the mouth 319 of the compartment 282 and, after the slave cassettes have been transferred to the mouth of the cassette, the slave cassettes are transferred through the mouth into the compartment.

It will be appreciated that the drive pins 310 and 312 align the slave cassette 28 before they drive the slave cassette 28 into the compartment 282. For example, if the slave cassette 28 is skewed to the left as shown in solid lines at 28f in FIG. 25, the drive pin 314 will engage the forward peripheral surface of the slave cassette 28 and will reposition the cassette to an aligned relationship before it reaches the rear peripheral surface of the slave cassette as shown in that Figure. Similarly, if the position of the slave cassette 28 is skewed to the right as indicated schematically in broken lines at 28g in FIG. 25, the drive pin 314 will engage the forward surface of the slave cassette as it moves from the position shown in FIG. 25 to the position shown in FIG. 26. As the drive pin 314 continues to move toward the position shown in FIG. 26, it will align the slave cassette so as to be able to clear the slave cassette and reach the position shown in FIG. 26.

The apparatus shown in the drawings and described above may include several doors for purposes of safety. For example, the apparatus may include a door 330 (FIG. 2) pivotable as at 332 for preventing access in the closed position to the master cassette 21 in the 0° and 15° positions of the master cassette and for providing access in the open position to load the master cassette into the apparatus. The apparatus may also include a front door 334 (FIG. 2) pivotable as at 336. In the closed position, the door 334 prevents access to the components shown in FIG. 1 including the pinch roller 50 and the capstan and the threading arms. In the open position, the door 334 provides access to these components. Only a portion of the door 334 is shown in FIG. 2.

Figure 10:
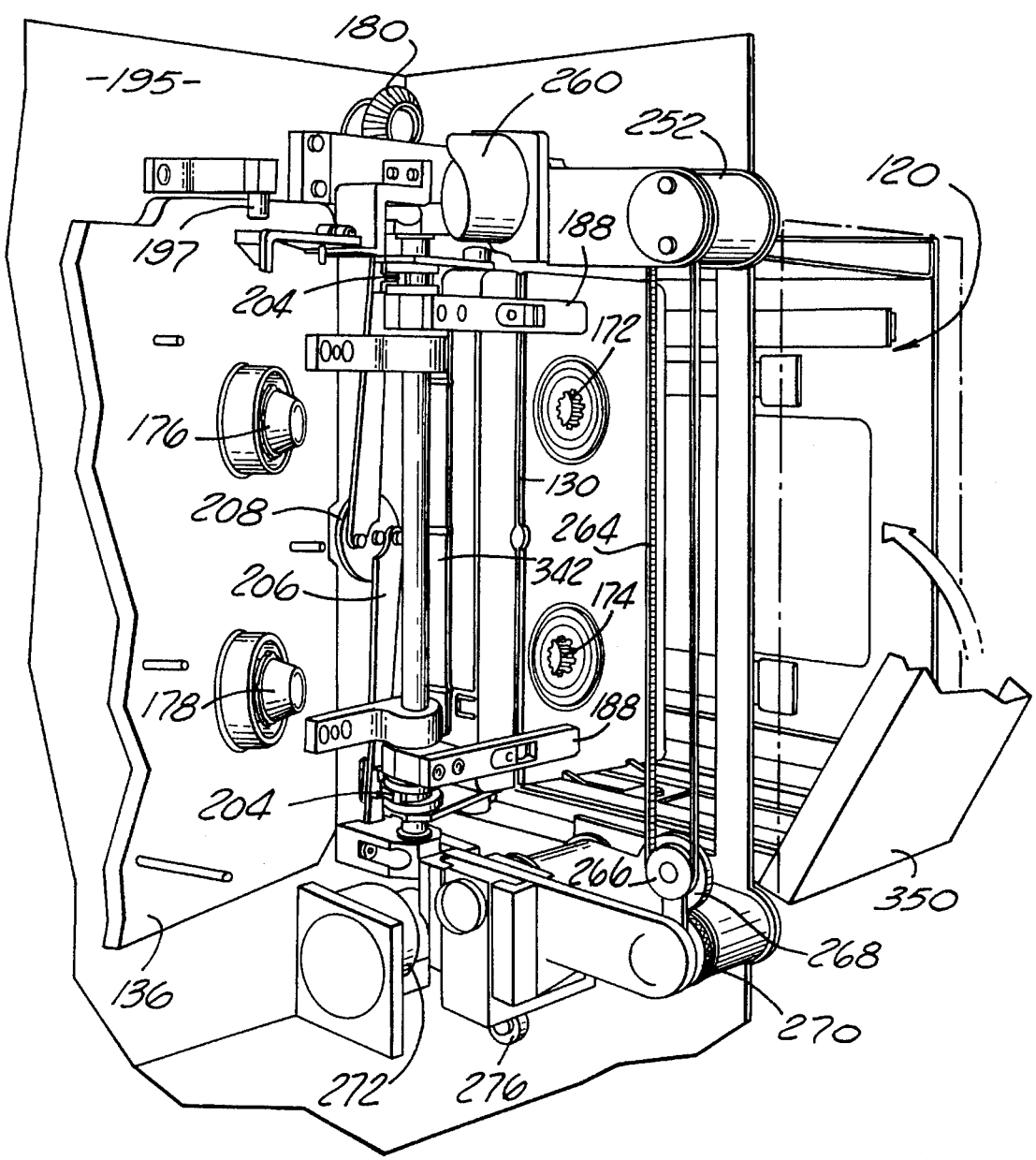
FIG. 10 is a perspective view of the apparatus shown in FIG. 9 with a door at the front of the first (supply) station partially open, this door being opened to provide for the stacking of additional ones of the slave cassettes into the first (supply) station.
Figure 12:
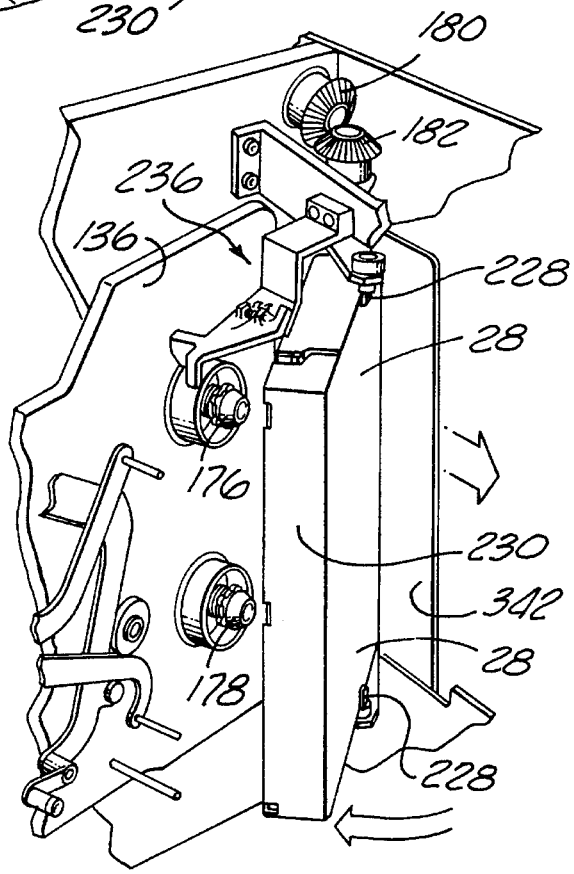
FIG. 12 is a schematic fragmentary perspective view similar to that shown in FIG. 9 but with the slave cassette approaching the second (threading) station in its pivotal movement.

The apparatus may include a slidable door 342 (FIG. 12). The slidable door 342 may be operated by a motor 344 (FIG. 2) and by a rack and pinion arrangement 346. The door 342 is slidable to a closed position preventing the forward one of the slave cassettes in the station 120 from being transferred to the 15° and 0° positions. A door 350 (FIG. 10) is disposed at the front end of the supply station 120. In the open position, the door 350 provides for the insertion of additional ones of the slave cassettes 28 into the supply station 120. In the closed position, the door 350 prevents such insertion.

FIG. 29 provides a flow chart showing a subroutine for positioning the master tape 10 to provide an image on the slave tape 12 in the forward one of the slave cassettes 28 after such slave cassette has been transferred to the 0° position or station. As shown in FIG. 29, the subroutine for loading the master tape and determining its length is selected in the software by selecting the proper "Call" subroutine in the software.

As indicated in the flow chart in FIG. 29, a first step in the subroutine is to determine if the master tape 10 has been provided at the position 21a in FIG. 2. A determination is then made as to whether the magazine door 330 on the master side is closed. This door is to prevent access to the master cassette 21 from an external position when the master tape is in an operative position. If the door 330 is not closed, an error is indicated in one of the lights 338 on the panel 340 and the subroutine is prevented from continuing. If the door 330 is closed, the master cassette 21 is pivoted to the 15° position or station.

The master tape 10 is then wound so that substantially all of the tape is on the take-up reel 18 (FIG. 1) and the master tape 10 is at the beginning of the image or movie. The master tape 10 is thereafter wound on the supply reel 16 to the end of the image or movie. The master tape 10 is then disposed on the pinch roller 50 at the 0° station and the pinch roller is moved at the 0° station into abutting relationship with the capstan 72. The master tape 10 is then rewound on the take-up reel 18 until the end of the image or movie appears on the master tape.

During the rewinding of the master tape 10 on the take-up reel 18 at the 0° station with the pinch roller 50 and the capstan 72 in abutting relationship, the length of the image on the master tape 10 is determined. This determination is relatively precise because the capstan 72 is well coupled to the master tape 10 by force of the abutting pinch roller 50 at the 0° station and because the diameter and total rotation angle of the capstan is known with high accuracy. If substantially all of the master tape is on the take-up reel 18 at the end of the tape (actually the beginning of the image) with a small portion of tape remaining on the supply reel 16 after the completion of the image, the pinch roller 50 is displaced from the capstan 72. The master tape is then rewound on the supply reel 16 until the end of the image or movie on the tape. A return is then made to the software to obtain a selection in the software of the next subroutine to be performed.

FIG. 30 illustrates a simplified flow chart of a subroutine for indicating the steps in preparing the master tape 10 to rewind the master tape. As a first step, the master tape is unthreaded. This includes the steps of moving the plate 90 to the 15° position and retracting the threading arms 92 and 94 and the dancer arm to the position shown in FIG. 5. The master tape 10 is then rewound on the take-up reel 18 at the 15° station to the position that constitutes the beginning of the tape (actually the end of the image or movie) on the master tape. The master tape 10 is thereafter rethreaded over the guide 44 and the pinch roller 50, and the master tape is returned to the 0° position ready to transfer the image again to another slave tape 12.

Although the subroutine shown in FIG. 30 and described above is satisfactory at the 15° station, it will be appreciated that the subroutine may also be accomplished with the master tape 10 in the 0° position. This eliminates any necessity of transferring the master cassette 21 from the 0° position to the 15° position before the subroutine shown in FIG. 30 and described above is performed.

Figure 31:
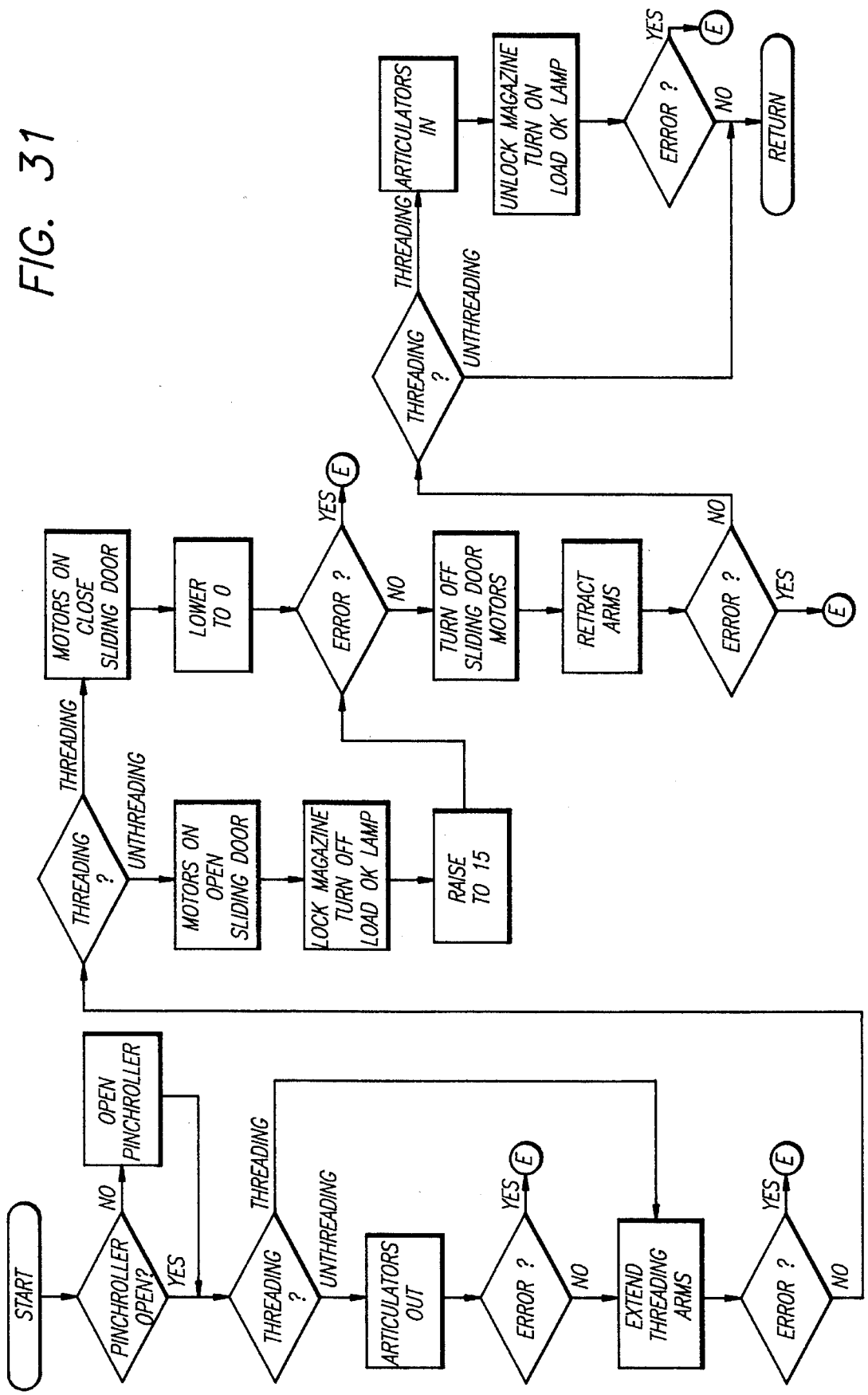
FIG. 31 is a flow diagram of a subroutine for disposing a slave tape on the capstan, the guide and the heater to obtain a transfer of the image on the master tape to the slave tape and for removing the slave tape from the capstan, the guide and the heater after such image transfer.

FIG. 31 illustrates the flow chart for the subroutine of threading and unthreading the slave tape 12. As a first step, a determination is made as to whether the pinch roller 50 is open, in other words, whether the pinch roller is displaced from the capstan 72. If the pinch roller 50 is not open, it is opened. If the pinch roller 50 is open and a threading operation is being performed on the slave tape 12, the threading arms 138 and 140 and the dancer arm 78 are extended at the 15° position of the slave cassette 28 from the position shown in FIG. 7 to the position shown in FIG. 8.

In the threading operation, the sliding door 342 (FIG. 12) is closed to prevent the forward one of the slave cassettes 28 from being transferred from the station 120. The plate 136 (FIGS. 2, 7 and 8) is then moved to the 0° position and a determination is made as to whether there is any angular error in the positioning of the plate. If there is no error in such positioning, the operation of the motor for the sliding door 342 is interrupted.

The threading arms 138 and 140 and the dancer arm 78 are then retracted from the position shown in FIG. 8 to the position shown in FIG. 7. If there is no error in such retraction, the articulator 64 is moved from the position shown in FIGS. 7 and 8 to the operative position shown in FIG. 1; the door 350 (FIG. 10) for the supply station 120 is unlocked; and a light is illuminated to indicate that this is a proper time for loading additional ones of the slave cassettes 28 into the supply station 120.

If an unthreading operation is being performed, the articulator 64 for the slave tape 12 is initially moved from the operative position shown in FIG. 1 to the extended position shown in FIGS. 7 and 8 to prevent the articulator from interfering with the threading operation. If there is no error in such movement, the threading arms 138 and 140 and the dancer arm 78 are extended from the position shown in FIG. 7 to the position shown in FIG. 8. If there is no error in such extension, the sliding door 342 (FIG. 12) is opened. The door 350 (FIG. 10) for the supply station 120 is then locked in the closed position. This prevents additional ones of the slave cassettes 28 from being inserted into the supply station 120. The lamp indicating the propriety of inserting the additional ones of the slave cassettes 28 into the supply station 120 is also turned off.

The plate 136 (FIGS. 2, 7 and 8) is then moved from the 0° position or station to the 15° position or station. If there is no error in this positioning, the operation of the motor 344 (FIG. 2) for moving the sliding door 342 (FIG. 12) is discontinued. The threading arms 138 and 140 and the dancer arm 78 are then moved from the extended position shown in FIG. 8 to the retracted position shown in FIG. 7. This completes the subroutine if there is no error. A different subroutine can then be selected.

Figure 32:
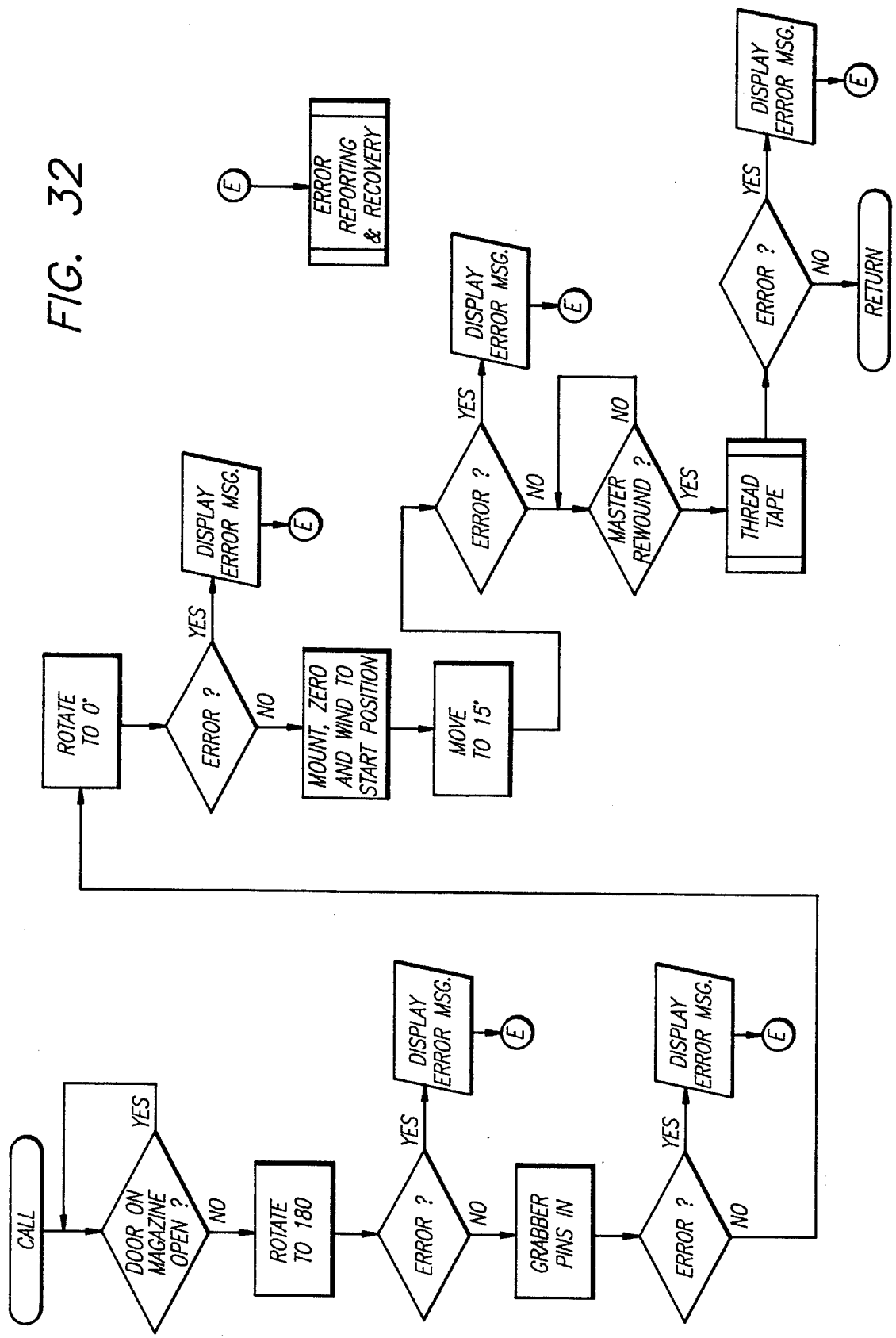
FIG. 32 is a flow diagram of a subroutine for gripping the forward one of the slave cassettes in the first (supply) station, pivoting the slave cassette to the second (threading) position and disposing the slave tape in such cassette on the capstan, guide and heater at the second station.

FIG. 32 shows the flow chart for a subroutine for transferring the slave cassettes 28 to the 0° station and transferring the image on the master tape 10 to the slave tape 12 at the 0° station. As a first step in this subroutine, a determination is made as to whether the door 350 (FIG. 10) to the supply station 120 is open. If the door 350 is not open, the mechanism for gripping and transporting the slave cassettes 28 is operated to move the mechanism to the 180° position where the supply station 120 is located. This mechanism is shown in FIG. 15–17A.

If the mechanism is properly positioned at the 180° station, the forward one of the slave cassettes 28 in the supply station is gripped by the mechanism shown in FIGS. 15–17A. This slave cassette is moved to the 0° position or station if there is no error in the gripping of this slave cassette. If the slave cassette is properly positioned at the 0° position, the slave tape is mounted at the 0° position and rewound to the zero position (so that all of the tape is on the supply reel 22). The slave tape 12 is then rewound on the tape-up reel 24 through a distance corresponding to the length of the image on the master tape 10. The slave tape 12 is now in a position to be rewound on the supply reel 16 while the image on the master tape 10 is transferred to the slave tape. The slave tape is then moved to the 15° position.

If there is no error in the steps described in the previous paragraph, a determination is made as to whether the master tape 10 is rewound to the position for transferring the image on the master tape to the slave tape. If the master tape 10 has been properly rewound to the desired position, the threading arms 138 and 140 and the dancer arm 78 are extended from the position shown in FIG. 7 to the position shown in FIG. 8; the slave cassette 28, the threading arms 138 and 140 and the dancer arm 78 are moved to the 0° position; and the threading and dancer arms are retracted at the 0° position to dispose the slave tape on the guide 68, the heater 70 and the capstan 72. If there is no error in these steps, the subroutine shown in FIG. 32 is completed as indicated by the "Return" block in FIG. 32.

Figure 33:
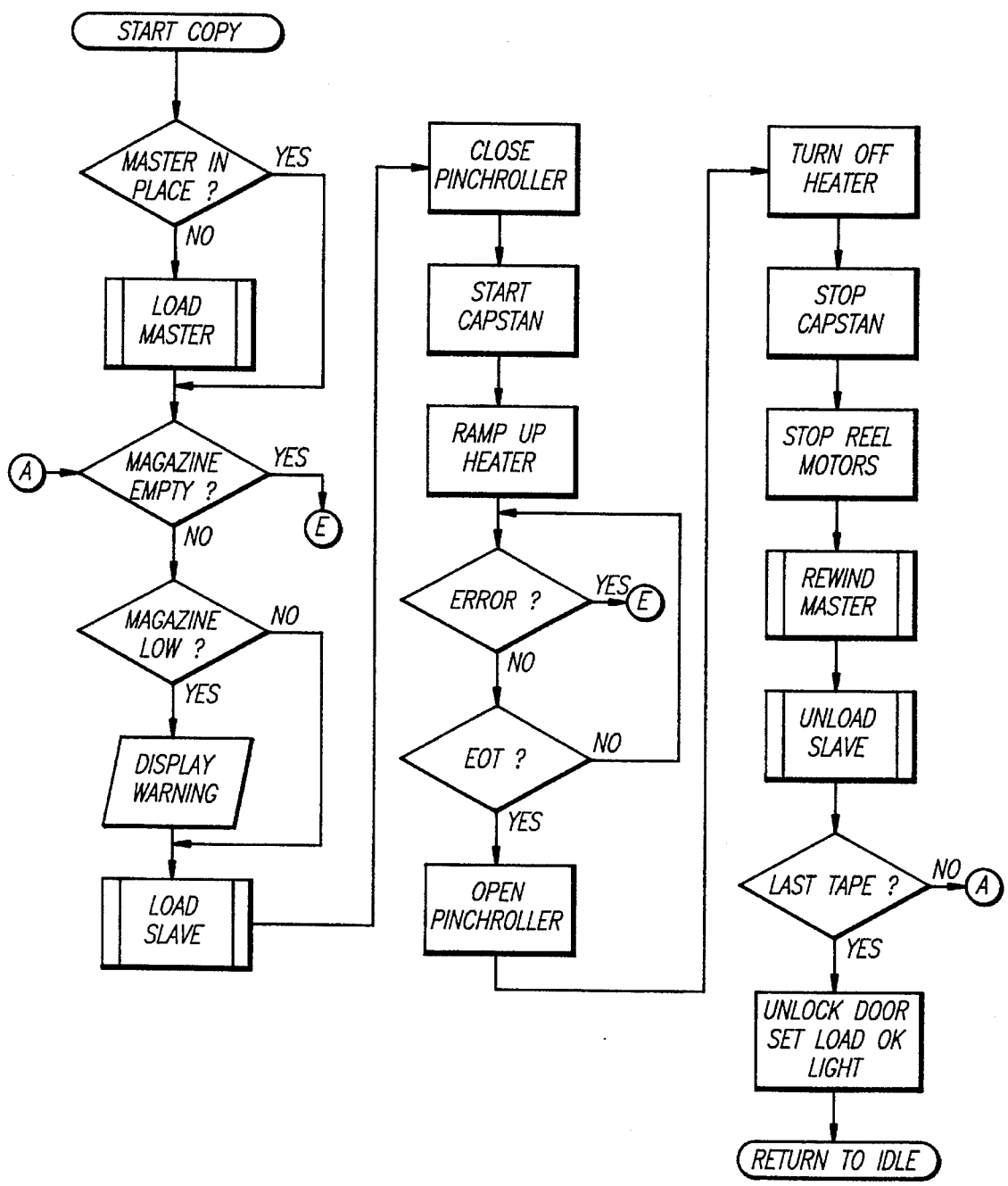
FIG. 33 is a flow diagram of a subroutine for transferring the image on the master tape to the slave tape after the slave tape has been transferred to the third (image transfer) position.

FIG. 33 is a flow chart of a subroutine for transferring the image on the master tape 10 to the slave tape 12. As a first step in the subroutine, a determination is made as to whether the master cassette 21 is in place. If the master cassette 21 is not in place, the master cassette is loaded into the apparatus and the master tape 10 is disposed on the pinch roller 50 at the 0° position or station. A determination is then made as to whether the supply station 120 is empty of slave cassettes 28. If the supply station 120 is empty of slave cassettes 28, an indication to this effect is provided. If the supply station 120 is not empty but the supply of the slave cassettes in the station is low, a display warning to this effect is provided so that the slave cassettes in the supply station can be replenished.

As long as there are slave cassettes 28 in the supply station 120, the forward one of the slave cassettes in the supply station 120 is transferred to the 15° position or station to receive the threader arms 138 and 140 and the dancer arm 78 (FIGS. 1, 7 and 8) and then to the 0° position or station. The slave tape in such cassette is then disposed on the guide 68, the heater 70 and the capstan 72. The pinch roller 50 is then moved to the closed position abutting the capstan 72 and the drive motor 13 (FIG. 1) for the capstan 72 is operated.

The heater 70 is energized. If there is no error in energizing the heater 70, the image on the master tape 10 is transferred to the slave tape 12. At the end of this image transfer or in the event of a heater or tape error, the heater 70 is turned off and the pinch roller 50 is moved from the position (FIG. 14) abutting the capstan 72 to the position (FIG. 13) displaced from the capstan. The rotation of the capstan 72 is discontinued. The motor 20 (FIG. 1) for the master tape 10 and the motor 26 for the slave tape 12 are de-energized. The master tape 10 is then rewound on the take-up reel 24 to the position (the end of the image or movie) for initiating a transfer to a slave cassette 28. Concurrent with rewinding the master tape 10, the slave cassette 28 is transferred to the receiving station 250.

If there are slave cassettes 28 remaining in the supply station 120, the sequence is returned to the position designated as "A" in FIG. 33 to initiate the steps of transferring the image on the master tape 10 to the tape 12 in the forward one of the slave cassettes 28 in the slave station 120. If the specified number of slave cassettes 28 have been coupled, the door 350 (FIG. 10) at the front of the supply 120 is unlocked and the light indicating the opportunity to insert additional ones of the slave cassettes 28 into the supply station 120 is illuminated. Additional ones of the slave cassettes 28 are then inserted into the supply station.

Figure 34:
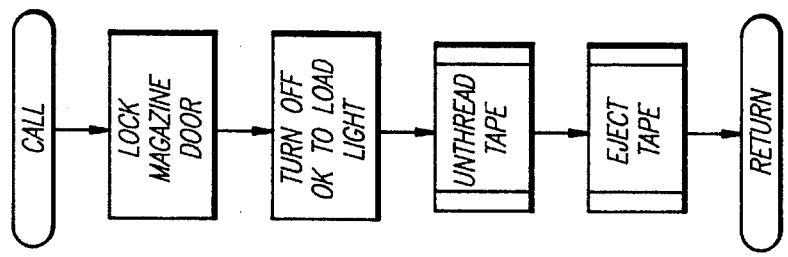
FIG. 34 is a flow diagram of a subroutine for removing the slave cassette from the capstan, the heater and the guide and for moving the slave cassette to the fourth (receiving) station after the image on the master tape has been transferred to the slave tape in such slave cassette.

FIG. 34 shows a flow chart of a subroutine for transferring one of the slave cassettes 28 to the receiving station 250 after the image on the master tape 10 has been transferred to the slave tape 12 in such cassette. The slave tape 12 is unthreaded from the guide 68, the door 350 (FIG. 10) at the front of the supply station 120 is locked and the light indicating the opportunity to load additional ones of the slave cassettes into the supply station is turned off, as part of the unthread tape routine, and the slave tape is moved to the receiving station 250.

Figure 35:
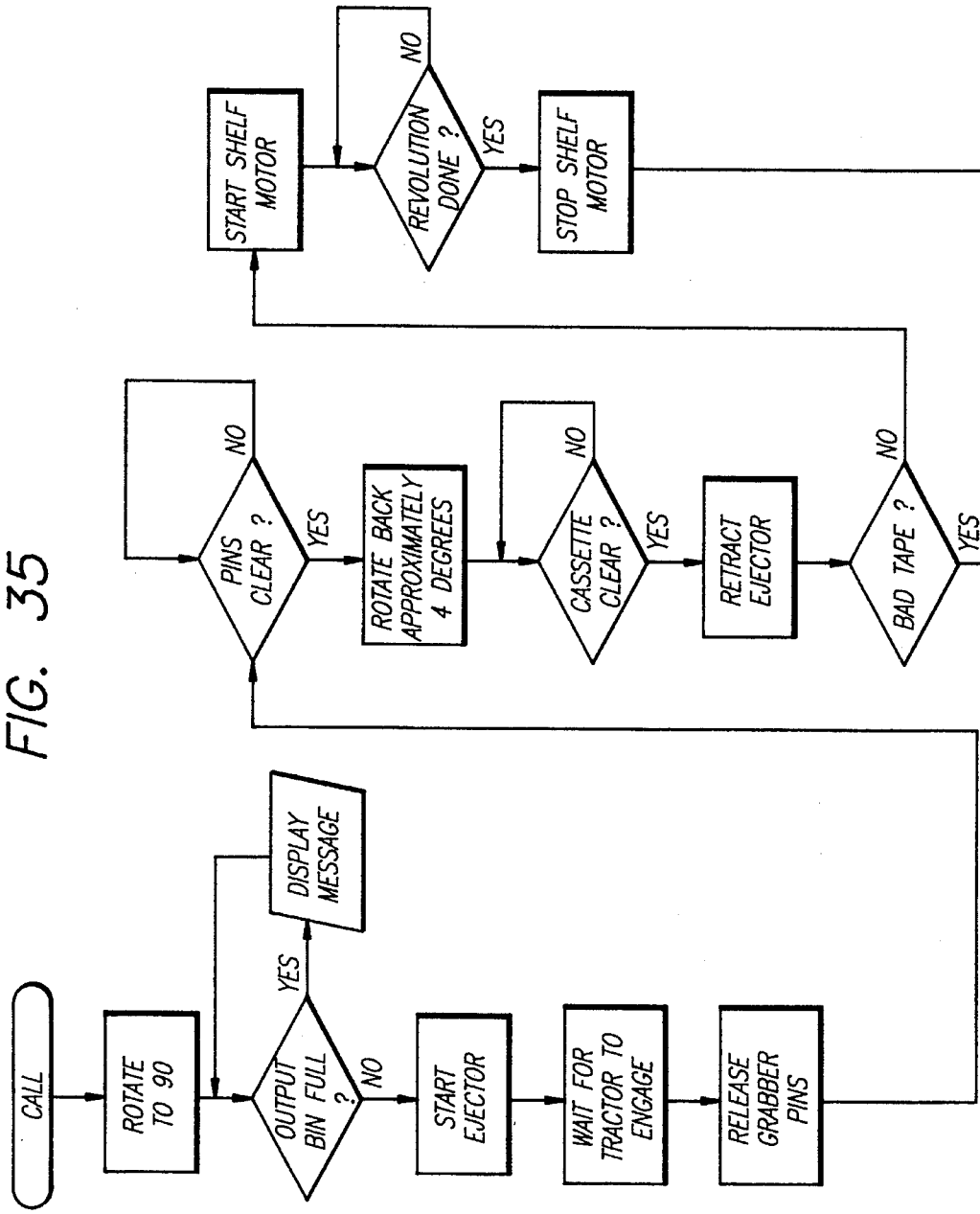
FIG. 35 is a flow diagram of a subroutine for transferring the slave cassette into the fourth (receiving) station after the slave cassette has been moved to the fourth station.

FIG. 35 shows a flow chart of a relatively detailed subroutine for transferring one of the slave cassettes 28 into the receiving station 250 after the image on the master tape 10 has been transferred to the slave tape 12 in such cassette. The slave cassette 28 is initially rotated from the 15° station to the station 250, which is at 90° relative to the supply station 120 and to the 0° station. A determination is then made as to whether the compartment 282 (the output bin) is full. If the compartment 282 is full, an indication to this effect is provided on an output display (not shown).

If the compartment 282 is not full, the lower one of the belts 252 is raised to engage the bottom surface of the slave cassette 28. When the lower one of the belts 252 (FIG. 23) has engaged the bottom surface of the slave cassette 28, the fingers 228 (FIG. 17A) are removed from engaging the rear periphery of the slave cassette 28. When the fingers 228 have cleared the slave cassette 28, the slave cassette 28 is rotated from the 90° position through a few degrees (e.g. 4°) toward the 0° position. This allows the slave cassette 28 to become clear of the spring clips 132 (FIG. 3). The mechanism (FIGS. 15–17A) including the gears 180 and 182 is then retracted toward the 80° position from the 86° position and the belts 252 (FIG. 23) are operated to move the slave cassette 28 to the shelf 280 (FIG. 24).

Figure 26:
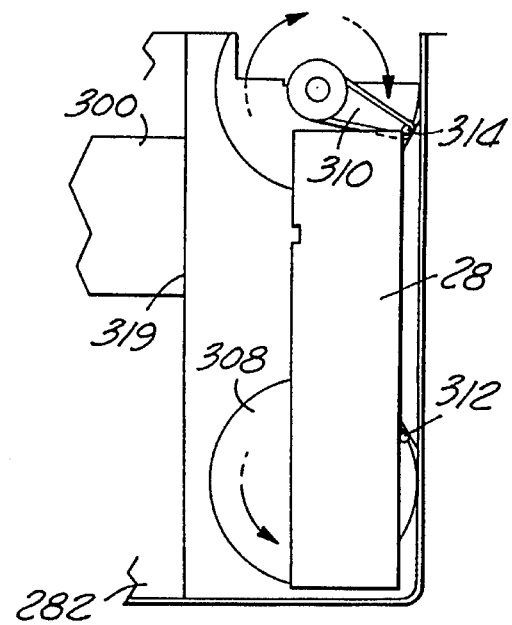
FIG. 26 is a fragmentary plan view similar to that shown in FIG. 25 and schematically illustrates the members at an intermediate position in transferring the slave cassette into the fourth (receiving) station.

A determination is then made as to whether the image on the master tape 10 has been properly recorded on the slave tape 12. If the determination is in the negative, the subroutine is completed and the slave cassette 28 holding this slave tape is removed and therefore not advanced into the compartment 282. The lower one of the belts 252 is then lowered and the pins 312 and 314 are rotated as shown in FIGS. 25–27 to move the slave cassette 28 into the compartment 282.

The apparatus and method described above have certain important advantages. They provide for a transfer of slave cassettes in sequence from the supply station 120 to the 15° position or station where the threading arms 138 and 140 and the dancer arm 78 are extended. The slave cassettes 28, the threading arms 138 and 140 and the dancer arm 78 are then moved to the 0° position or station and the slave tape is disposed on the guide 68, the heater 70 and the capstan 72 by retracting the threading arms 130 and 140 and the dancer arm 78 and by moving the articulator 64 to the operative position shown in FIG. 1. A similar procedure to that specified above is provided for the master cassette 21 when a different image than that previously provided is to be transferred to the slave tapes 12.

The image on the master tape 10 is then transferred to the slave tape 12 in the slave cassette 28. The image transfer is provided so that the beginning of the image or movie is at the beginning of the slave tape 12 when the slave tape is wound on the take-up reel 24 for the slave cassette 28. In this way, the slave tape 12 in the slave cassette 28 is in a position to be used by a viewer. The slave cassette 28 is then transferred to the output station 250 and is transferred into the station for disposition in a stacked relationship.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In a method of transferring to slave tapes an image on a master tape, the master tape being disposed in a first cassette having a first supply reel and a first take-up reel and the slave tapes being disposed in second cassettes each having a second supply reel and a second take-up reel, each of the second cassettes having a first periphery and a second periphery and having a groove at the first periphery in the cassette, the following steps:

disposing the second cassettes in a stacked relationship in a first station, extending a first arm into the groove in the first periphery of a first one of the second cassettes in the first station and extending a second arm into the space between the groove in the first periphery of a second one of the second cassettes in the first station and the second periphery of the first cassette and gripping the peripheries of such first one of the second cassettes with the first and second arms, the second one of the second cassettes being adjacent the first one of the second cassettes in the first station, moving such first one of the second cassettes from the first station to a particular station while the first and second arms are at the peripheries of the first one of the second cassettes, transferring at the particular station the image on the master tape to such first one of the second cassettes, and thereafter moving such first one of the second cassettes, while the first and second arms grip the first and second peripheries of the first ones of the second cassettes, to a second station for holding the second cassettes in a stacked relationship in the second station.

2. In a method as set forth in claim 1, the additional steps of:

extending the first arm into the groove in the first periphery of such second one of the second cassettes in the first station and extending the second arm into the space between the groove in the first periphery of a third one of the second cassettes in the first station and the second periphery of such second one of the second cassettes in the first station and gripping the first and second peripheries of such second one of the second cassettes in the first station with the first and second arms, the second and third ones of the second cassettes being adjacent to each other in the second station, and moving such second one of the second cassettes in the first station to the particular station to obtain a transfer of the image on the master tape to the slave tape in such second one of the second cassettes.

3. In a method as set forth in claim 1 wherein the step of transferring the image on the master tape to the slave tape in such first one of the second cassettes includes the steps of winding the slave tape in such first one of the second cassettes on the supply reel in such first cassette to the end of such slave tape and thereafter unwinding such slave tape from such supply reel to the take-up reel in such first one of the second cassettes through a distance corresponding to the length of the image on the master tape and thereafter rewinding such slave tape on such supply reel in the first one of the second cassettes while transferring the image on the master tape to such slave tape.

4. In a method as set forth in claim 3 wherein the slave tape in such first one of the second cassettes is disposed on a capstan and the master tape is disposed on a pinch roller and the pinch roller is movable to a first position abutting the capstan to provide a transfer of the image on the master tape to such slave tape and the pinch roller is movable to a second position displaced from the capstan to provide for a disposition of the slave tape on the capstan and the master tape on the pinch roller and for a removal of the slave tape from the capstan.

5. In a method of transferring to slave tapes an image on a master tape, the master tape being disposed in a first cassette having a first supply reel and a first take-up reel and the slave tapes being disposed in second cassettes each having a second supply reel and a second take-up reel each of the second cassettes having a first periphery and a second periphery and having a groove at a particular position in its first periphery, the following steps:

disposing the second cassettes in a stacked relationship in a first station, extending a first arm into the groove in the first periphery of a first one of the second cassettes in the first station and extending a second arm into the space between the groove in the first periphery of a second one of the second cassettes in the first station and the second periphery of the first one of the second cassettes and gripping the first and second peripheries of the first one of the second cassettes, the first and second ones of the second cassettes being adjacent to each other in the first station, moving the first one of the second cassettes to a second station having a capstan for receiving on its periphery the slave tape in the first one of the second cassettes and having a pinch roller for receiving on its periphery the master tape in the first cassette, the pinch roller being movable between a first position abutting the capstan and a second position displaced from the capstan, disposing the slave tape in the first one of the second cassettes on the capstan with the pinch roller in the second position, moving the pinch roller from the second position to the first position, transferring the image on the master tape to the slave tape in the first one of the second cassettes with the pinch roller in the first position, moving the pinch roller from the first position to the second position, removing the slave tape in the first one of the second cassettes from the capstan with the pinch roller in the second position, and transferring the first one of the second cassettes from the second station to a third station.

6. In a method as set forth in claim 5, the steps of:

repeating the sequence recited in claim 5 sequentially for the second one of the second cassettes and for each of the successive ones of the second cassettes in the second station.

7. In a method as set forth in claim 5 wherein the step of transferring the image on the master tape to the slave tape in the first one of the second cassettes includes the steps of:

winding the slave tape on the supply reel in the first one of the second cassettes with the pinch roller in the second position, winding the slave tape from the supply reel to the take-up reel in the first one of the second cassettes through a distance corresponding substantially to the length of the image on the master tape with the pinch roller in the second position, moving the pinch roller from the second position to the first position, and rewinding the slave tape on the supply reel in the first one of the second cassettes with the pinch roller in the first position to obtain the transfer of the image on the master tape to the slave tape in the first one of the second cassettes.

8. In a method as set forth in claim 7, repeating the sequence recited in claim 7 sequentially for the second one of the second cassettes and for each of the successive ones of the second cassettes in the second station.

9. In a method as set forth in claim 8, each of the second cassettes being moved from the first station to the second station by rotating the first and second arms and such second cassette through a first particular angle, and each of the second cassettes being moved from the second station to the third station by rotating the first and second arms and such second cassette through a second angle different from the first particular angle.

10. In combination for transferring to slave tapes an image on a master tape, the master tape being disposed in a first cassette having a first supply reel and a first take-up reel and the slave tapes being disposed in second cassettes each having a second supply reel and a second take-up reel, each of the second cassettes having first and second external surfaces substantially parallel to each other and having a groove at a particular position on the first external surface of such cassette, first means for defining a first station for receiving the second cassettes in a stacked relationship, second means movable relative to the second cassettes in the first station for gripping each of the second cassettes in the first station in sequence at the position of the groove on the first external surface of such cassette and for gripping the second external surface of such cassette at the position corresponding to the position of the groove in the next one of the second cassettes in the first station, third means for moving each of such second cassettes, upon the gripping of such cassette by the second means, in sequence from the first station to a particular station displaced from the first station while the second means grips the first external surface of such cassette at the position of the groove and grips the second external surface of such cassette at the position corresponding to the position of the groove in the next one of the second cassettes in the first station, fourth means for transferring the image of the master tape to the slave tape in each of the second cassettes at the particular station upon the movement of such second cassette by the third means to the particular station.

11. In a combination as set forth in claim 10, the fourth means including a capstan for engaging the slave tape in each of the second cassettes and a pinch roller for engaging the master tape, the pinch roller being movable between a first position with the pinch roller abutting the capstan and a second position with the pinch roller in a position displaced from the capstan to provide for the disposition on the capstan of the slave tape in each of the second cassettes when the pinch roller is in the second position, fifth means for moving the pinch roller to the second position before the transfer of each of the second cassettes to the particular station, sixth means for moving the pinch roller to the first position after each of the second cassettes has been transferred to the particular station, the fourth means being operative to transfer the image on the master tape to the slave tape at the particular station after the pinch roller has been moved to the first position.

12. In a combination as set forth in claim 11, seventh means for defining a second station for holding the second cassettes in a stacked relationship, eighth means for transferring each of the second cassettes in sequence from the particular station to the second station after the transfer of the image on the master tape to the slave tape in such second cassette, and ninth means for stacking the second cassettes in the second station after the transfer of the second cassettes in sequence to the second station.

13. In a combination as set forth in claim 10, fifth means for defining a second station for holding the second cassettes in a stacked relationship, the second station being displaced from the first station, sixth means for transferring each of the second cassettes in sequence from the particular station to the second station after the transfer of the image on the master tape to the slave tape in such second cassette and while the second means grips the first external surface of such cassette at the position of the groove and grips the second external surface of such cassette at the position corresponding to the position of the groove in the next one of the second cassettes in the first station.

14. In a combination as set forth in claim 13, seventh means for stacking the second cassettes in the second station after the transfer of the second cassettes to the second station.

15. In a combination as set forth in claim 10, the third means being initially operative to move each of the second cassettes from the first station to a particular position before the particular station, the fourth means including a pinch roller for engaging the master tape in the first cassette and a capstan for engaging the slave tape in each of the second cassettes, there being threading arms movable between a first relationship initially engaging the slave tape in each of the second cassettes and subsequently providing for the engagement of the slave tape in each of the second cassettes by the capstan and a second relationship providing for a disposition of the slave tape in each of the second cassettes in displaced relationship to the capstan at a position above the capstan, fifth means for initially moving the threading arms from the first relationship to the second relationship at the particular position, the third means being operative to move each of the second cassettes to the particular station after the disposition of the threading arms in the second relationship, and the fifth means being operative to dispose the threading arms in the first relationship after the movement of each of the second cassettes to the particular station to dispose the slave tape in such second cassette on the capstan.

16. In a combination as set forth in claim 15, the pinch roller being movable between a first position abutting the capstan and a second position displaced from the capstan, means for moving the pinch roller to the second position before the disposition of the threading arms in the first relationship at the particular station, and means for moving the pinch roller to the first position at the particular station after the movement of the threading arms to the first relationship at the particular station to couple the master tape on the pinch roller to the slave tape in each of the second cassettes on the capstan to obtain a transfer of the image on the master tape to the slave tape.

17. In combination for transferring to slave tapes the image on a master tape, the master tape being disposed in a first cassette having a first supply reel and a first take-up reel, the slave tapes being disposed in second cassettes each having a second supply reel and a second take-up reel, each of the second cassettes having first and second substantially parallel peripheries and each having a groove on its first periphery, means for defining a station in which the second cassettes are disposed in a stacked relationship, gripping means for gripping a first one of the second cassettes in the station at the groove in the first periphery of such first one of the second cassettes and for gripping the second periphery of the first one of the second cassettes in the station at the position corresponding to the position of the groove of a second one of the second cassettes in the station, first means for providing a movement of the gripping means into the groove in the first periphery of the first one of the second cassettes in the station and the groove in the second one of the second cassettes in the station, the first and second ones of the second cassettes being disposed in a sequential relationship in the station, and second means for providing a transfer of the first one of the second cassettes from the station during the gripping by the gripping means of the first one of the second cassettes in the station at the first and second peripheries of such first one of such second cassettes.

18. In a combination as set forth in claim 17, means for providing a transfer of the image on the master tape to the slave tape in the first one of the second cassettes after the transfer of the first one of the second cassettes from the station.

19. In a combination as set forth in claim 18, means for defining a second station for holding the second cassettes in a stacked relationship, and means for providing a transfer of the first one of the second cassettes to the second station after the transfer of the image on the master tape to the slave tape in the first one of such second cassettes and while the gripping means grips the first and second peripheries of the first one of the second cassettes, and the gripping means being operative to release the first one of the second cassettes after the transfer of such first one of the second cassettes to the second station.

20. In a combination as set forth in claim 19, means operative after the release of the first and second peripheries of the first one of the second cassettes by the gripping means for moving the first one of the second cassettes into the second station upon the transfer of such first one of such second cassettes to the second station.

21. In combination for transferring an image on a master tape to slave tapes, the master tape being disposed in a first cassette having a first supply reel and a first take-up reel, the slave tapes being disposed in second cassettes each having a second supply reel and a second take-up reel and having first and second substantially parallel peripheries and each having a groove on its first periphery, first means for defining a first station for retaining the second cassettes, second means for gripping a first one of the second cassettes in the first station at the groove in such first one of the second cassettes, third means for gripping the first one of the second cassettes at a position corresponding to the position of the groove in a second one of the second cassettes in the first station, the first and second ones of the second cassettes being next to each other in the first station, fourth means for providing a movement of the second and third means in a synchronized relationship to grip the first and second peripheries of the first one of the second cassettes while the first one of the second cassettes is still in the first station, fifth means for operating upon the fourth means to obtain a synchronous movement of the second means into the groove in the first periphery of the first one of the second cassettes in the station and the third means into the groove in the second one of the second cassettes in the station, and sixth means for moving the first one of the second cassettes from the first station upon and during the gripping by the second and third means of the first and second peripheries of such first one of the second cassettes.

22. In a combination as set forth in claim 21, means responsive to the transfer of the first one of the second cassettes from the first station by the sixth means for transferring the image on the master tape to the slave tape in such cassette.

23. In a combination as set forth in claim 22, the second means including a first pair of members respectively disposed at positions below the top and above the bottom of the first one of the second cassettes in the first station to grip the first one of the second cassettes in the first station, and the third means including a second pair of members respectively disposed at positions respectively below the top and above the bottom of the first one of the second cassettes and being respectively movable downwardly and upwardly into the groove in the second one of the cassettes to grip the first one of the second cassettes in the first station.

24. In a combination as set forth in claim 22, means for defining a second station, and means responsive to the transfer of the image on the master tape to the slave tape in the first one of the second cassettes for transferring such cassette to the second station while the second and third means respectively grip the first and second peripheries of the first one of the second cassettes.

25. In a combination as set forth in claim 21, the second means including spring clips for moving into the groove in the forward first periphery of the first one of the second cassettes to grip such second cassette in the groove in such second cassette.

26. In a combination as set forth in claim 25, the second means including spring clips having properties of moving into the groove in the first periphery of the first one of the second cassettes to grip such cassette in the groove in such cassette, means for defining a second station, means responsive to the transfer of the image on the master tape to the slave tape on the first one of the second cassettes for transferring such cassette to the second station, the fourth means being operative upon the movement of the first one of the second cassettes to the second station for moving the second and third means in a synchronized relationship from the first one of the second cassettes, and means operative upon the movement of the second and third means from the first one of the second cassettes for moving such second cassette into the second station.

27. In combination for transferring to a slave tape an image on a master tape, the master tape being disposed in a first cassette having a first supply reel and a first take-up reel, the slave tape being disposed in a second cassette having a second supply reel and a second take-up reel and having first and second substantially parallel peripheries and having a groove at its first periphery, the second cassette being defined by another pair of substantially parallel peripheries, the distance between the first and second substantially parallel peripheries being less than the distance between the another pair of substantially parallel peripheries, gripping means for gripping the second cassette at the groove in its first periphery and at the second periphery, first means for providing a transfer of the image on the master tape to the slave tape in the second cassette while the gripping means grips the second cassette at the groove in the first periphery of the second cassette and at a position in the second periphery of the second cassette corresponding to the position of the groove in the first periphery of the second cassette, second means for defining a station for holding the second cassette, third means responsive to the transfer of the image on the master tape to the slave tape in the second cassette for transferring the second cassette to the station while the gripping means grips the second cassette at the groove in the first periphery of the second cassette and at the second periphery of the second cassette, fourth means operative on the gripping means at the station for releasing the gripping means from gripping the second cassette, and fifth means responsive to the release of the second cassette by the gripping means at the station for transferring the second cassette into the station.

28. In a combination as set forth in claim 27, the gripping means including first gripping means for gripping the second cassette at the groove in the first periphery of the second cassette and including second gripping means for gripping the second cassette at the second periphery of the second cassette and further including sixth means for respectively moving the first and second gripping means in a synchronous relationship into gripping relationship with the first and second peripheries of the second cassette.

29. In a combination as set forth in claim 28, the fifth means including sixth means for repositioning the second cassette, regardless of the positioning of the second cassette by the third means in the transfer of the second cassette by the third means to the station, for the transfer of the second cassette into the station.

30. In a combination as set forth in claim 27, the station having an open mouth, the third means being operative to transfer the second cassette to a position in front of the open mouth of the station, and the fifth means being operative to transfer the second cassette into the station from the position in front of the open mouth of the station after the release of the second cassette by the gripping means at the station.

31. In a combination as set forth in claim 30, the fifth means including pins pivotable from a position misaligned with the open mouth of the station to a position aligned with the open mouth of the station for transferring the second cassette into the station through the open mouth of the station after the release of the second cassette by the gripping means at the station.

32. In combination for transferring to a slave tape an image on a master tape, the master tape being disposed in a first cassette having a first supply reel and a first take-up reel, the slave tape being disposed in a second cassette having a second supply reel and a second take-up reel and having first and second substantially parallel peripheries and having a groove at its first periphery, the second cassette being defined by another pair of substantially parallel peripheries, the distance between the first and second substantially parallel peripheries being less than the distance between the another pair of substantially parallel peripheries, gripping means for gripping the second cassette at the groove in the first periphery of the second cassette and at the second periphery of the second cassette, first means for transferring to the slave tape the image on the master tape, second means for defining a station having an open mouth for receiving the second cassette and other second cassettes in a stacked relationship, the open mouth having a particular width, third means operative after the transfer of the image on the master tape to the slave tape for transferring the second cassette to a position substantially parallel to the open mouth of the station, but displaced from the station in a direction corresponding to the direction of the particular width of the mouth of the station, while the third means grips the second cassette at the position of the groove in the first periphery of the second cassette and at a position in the second periphery of the second cassette corresponding to the position of the groove in the first periphery of the second cassette, fourth means responsive to the transfer of the second cassette by the third means to the position substantially parallel to the open mouth of the station for holding the second cassette at the top and the bottom of the second cassette and for moving the second cassette to the open mouth of the station in the direction corresponding to the particular width of the mouth of the station, and fifth means operative upon the movement of the second cassette to the open mouth of the station for transferring the second cassette into the station through the open mouth of the station.

33. In a combination as set forth in claim 32, the gripping means including first gripping means for gripping the second cassette at the groove in the first periphery of the second cassette and including second gripping means for gripping the second cassette at the second periphery of the second cassette and further including means for synchronizing the movements of the first and second gripping means to positions for gripping the second cassette.

34. In a combination as set forth in claim 32, the third means including means for pivoting the second cassette from the first means to the station after the transfer of the image on the master tape to the slave tape, and the fourth means including belts for holding the second cassette and for moving the second cassette in the direction corresponding to the width of the mouth of the cassette after the pivotal movement of the second cassette.

35. In a combination as set forth in claim 34, the first and second peripheries of the second cassette respectively constituting the front and rear surfaces of the second cassette and the gripping means being operative to grip the second cassette at corresponding positions on the first and second peripheries of the second cassette, the gripping means being operable to release the first and second peripheries of the second cassette when the third means transfers the second cassette to the position substantially parallel to the open mouth of the station but displaced from the station in the direction corresponding to the direction of the particular width of the mouth of the station.

36. In a combination as set forth in claim 32, the fifth means including pins rotatable after the movement of the second cassette by the fourth means to the open mouth of the station to move the second cassette into the station through the open mouth of the station.

37. In a combination as set forth in claim 32, the fifth means including sixth means operable upon a skewed disposition of the second cassette relative to the open mouth of the station for positioning the second cassette substantially parallel to and aligned with the open mouth of the station and for then moving the second cassette into the station through the open mouth of the station.

38. In a combination as set forth in claim 32, the gripping means being operative to grip the second cassette at corresponding positions on the first and second peripheries of the second cassette.

39. In combination for transferring an image on a master tape to slave tapes, the master tape being disposed in a first cassette having a first supply reel and a first take-up reel, the slave tapes being disposed in second cassettes each having a second supply reel and a second take up reel and each having first and second substantially parallel peripheries and having a groove in the first periphery, first means for defining a first station for holding the second cassettes in a stacked relationship, second means for sequentially gripping each successive one of the second cassettes in the first station at the groove in the first periphery of such cassette and at the second periphery of such cassette at a position in such second periphery corresponding to the position of the groove in the next one of the second cassettes in the first station, third means for defining a second station, fourth means for transferring each successive one of the second cassettes in sequence from the first station to the second station with the second means gripping such successive one of the second cassettes at the groove in the first periphery of such second cassette and at the second periphery of such second cassette at the position in such second periphery corresponding to the position of the groove in the next one of the second cassettes in the first station, and fifth means for transferring the image on the master tape to the slave tape in each successive one of the second cassettes at the second station while the second means is gripping such successive one of the second cassettes at the groove in the first periphery of such cassette and at the second periphery of such cassette at the position in such second periphery corresponding to the position of the groove in the next one of the second cassettes in the first station.

40. In combination for transferring an image on a master tape to slave tapes, the master tape being disposed in a first cassette having a first supply reel and a first take-up reel, the slave tapes being disposed in second cassettes each having a second supply reel and a second take up reel and each having first and second peripheries and having a groove in the first periphery, first means for defining a first station for holding the second cassettes in a stacked relationship, second means for sequentially gripping each successive one of the second cassettes in the first station at the groove in the first periphery of such cassette and at the second periphery of such cassette, third means for defining a second station, fourth means for transferring each successive one of the second cassettes in sequence from the first station to the second station with the second means gripping such successive one of the second cassettes at the groove in the first periphery of such second cassette and at the second periphery of such second cassette, and fifth means for transferring the image on the master tape to the slave tape in each successive one of the second cassettes in sequence at the first station, the second means gripping each successive one of the second cassettes at the groove in the first periphery of such second cassette and at the second periphery of such second cassette during the transfer of the image on the master tape to the slave tape in such second cassette, and sixth means for transferring each successive one of the second cassettes from the second station, after the transfer of the image on the master tape to the slave tape in such successive one of the second cassettes, while the second means is gripping such successive one of the second cassettes at the groove in the first periphery of such second cassette and at the second periphery in such second cassette.

41. In a combination as set forth in claim 40, seventh means for defining a third station for holding the successive ones of the second cassettes in a stacked relationship, and eighth means for transferring each successive one of the second cassettes in sequence to the third station, after the transfer of the image on the master tape to the slave tape in such second cassette, while the second means is gripping such successive one of the second cassettes at the groove in the first periphery of such second cassette and at the periphery of such second cassette.

42. In a combination as set forth in claim 41, the second means being operative to release each successive one of the second cassettes upon the transfer of such second cassette to the third station, and ninth means for transferrin each successive one of the second cassettes into the third station upon the release of such second cassette by the second means.

43. In combination for transferring an image on a master tape to slave tapes, the master tape being disposed in a first cassette having a first supply reel and a first take-up reel, the slave tapes being disposed in second cassettes each having first and second substantial parallel peripheries and having a groove in the first periphery, the second cassettes being disposed in a stacked relationship, first means for gripping each successive one of the second cassettes at the groove in the first periphery of such second cassette and at the second periphery of such second cassette at a position corresponding to the groove in the first periphery of the next one of the second cassettes in the stacked relationship, second means for transferring the image on the master tape to the slave tape in each successive one of the second cassettes while the first means is gripping such second cassette at the groove in the first periphery of the second cassette and at the second periphery of the second cassette at the position corresponding to the groove in the first periphery of the next one of the second cassettes in the stacked relationship, the transfer of the image on the master tape to the slave tape in each successive one of the second cassettes occurring at a particular position, and third means for transferring each successive one of the second cassettes from the particular position, after the transfer of the image on the master tape to the slave tape in such successive one of the second cassettes at the particular position, while the first means grips such successive one of the second cassettes at the groove in the first periphery of such second cassettes and at the second periphery of such second cassettes at the position corresponding to the groove in the first periphery of the next one of the second cassettes in the stacked relationship.

44. In a combination as set forth in claim 43, fourth means for defining a station for holding the successive ones of the second cassettes in a stacked relationship, the third means being operative to transfer each successive one of the second cassettes to the fourth means while the first means grips such second cassette at the groove in the first periphery of such second cassette and at the second periphery of such second cassette at the position corresponding to the groove in the first periphery of the next one of the second cassettes in the stacked relationship.

45. In a combination as set forth in claim 44, the first means being operative to release each successive one of the second cassettes at the groove in the first periphery of such successive one of the second cassettes and at the second periphery of such cassette at the position of the groove in the first periphery of the next one of the second cassettes in the stacked relationship upon the transfer of such second cassette to the station, and seventh means operative upon the release at the station of each successive one of the second cassettes at the groove in the first periphery of such successive one of the second cassettes and at the second periphery of such successive one of the second cassettes at the position corresponding to the position of the groove in the next one of the second cassettes in the stacked relationship for moving such successive one of the second cassettes into the station.

46. In a method of transferring to slave tapes an image on a master tape, the master tape being disposed in a first cassette having a first supply reel and a first take-up reel and the slave tapes being disposed in second cassettes each having a supply reel and a take-up reel, each of the slave cassettes having a first periphery and a second periphery substantially parallel to the first periphery and having a groove in the first periphery, the steps of:

gripping each successive one of the second cassettes at the groove in the first periphery and at the second periphery at a position corresponding to the position of the groove in the next one of the second cassettes in the first station while such second cassettes are stacked in the first station, transferring each successive one of the second cassettes from the first station to a second station while such second cassette is gripped at the groove in the first periphery of such second cassette and at the second periphery of such second cassette at the position corresponding to the position of the groove in the next one of the second cassettes in the first station, providing the slave cassettes in a stacked relationship in a first station, transferring the image on the master tape to the slave tape in each successive one of the second cassettes at the second station while such successive one of the second cassettes is being gripped at the groove in the first periphery of such second cassette and at the second periphery of such second cassette at the position corresponding to the position of the groove in the next one of the second cassettes in the first station, and thereafter transferring each successive one of the second cassettes to a third station while each second cassette is being gripped at the groove in the first of such second cassettes and at the second periphery of such second cassette at the position corresponding to the position of the groove in the next one of the second cassettes in the first station, the first, second and third stations being displaced from one another.

47. In a method as set forth in claim 46, the steps of:

releasing the gripping of each successive one of the second cassettes at the groove in the first periphery of such successive one of the second cassettes and at the second periphery of such successive one of the second cassettes at the position corresponding to the groove in the first periphery of the next one of second cassettes in the stacked relationship when such successive one of the second cassettes reaches the third station, and thereafter transferring each successive one of the second cassettes into the third station after the release of the gripping of such successive one of the second cassettes at the groove in the first periphery of such cassette and at the second periphery in such second cassette at the position corresponding to the groove in the first periphery of the next one of the second cassettes in the stacked relationship.

48. In a method as set forth in claim 47 wherein the third station has an open mouth through which each of the successive ones of the second cassettes passes to become stacked in the third station and wherein each successive one of the second cassettes is aligned with the mouth in the third station after the gripping of such successive one of the second cassettes becomes released at the groove in the first periphery of such successive one of the second cassettes and at the second periphery in such successive one of such second cassettes at the position corresponding to the groove in the first periphery of the next one of the second cassettes in the stacked relationship and before the transfer of such successive one of such second cassettes into the third station.

49. In a method as set forth in claim 48 wherein the third station has a wall defining the open mouth of the third station and wherein the alignment of individual ones of the second cassettes with the open mouth of the third station includes a rotation of such cassettes relative to the open mouth of the third station and a movement thereafter of such cassettes in a direction corresponding to the direction of the wall defining the open mouth of the third station.

50. In a method of transferring to slave tapes an image on a master tape, the master tape being disposed in a first cassette having a first supply reel and a first take-up reel, the slave tapes being disposed in second cassettes each having a supply reel and a take-up reel, each of the slave cassettes having a first periphery and a second periphery substantially parallel to the first periphery and having a groove in the first periphery, the second cassettes being disposed in a stacked relationship, the steps of:

gripping each successive one of the second cassettes at the groove in the first periphery of such cassette and at the second periphery in such cassette at the position corresponding to the groove in the first periphery of the next one of the second cassettes in the stacked relationship, transferring the image on the master tape to the slave tape in each successive one of the second cassettes while gripping such cassette at the groove in the first periphery and at the second periphery of such successive one of the second cassettes at the position corresponding to the groove in the first periphery of the next one of the second cassettes in the stacked relationship, thereafter transferring each successive one of the second cassettes to a station while gripping such cassette at the groove in the first periphery and at the second periphery of such cassette at the position corresponding to the groove in the first periphery of the next one of the second cassettes in the stacked relationship, thereafter releasing the gripping of each successive one of the second cassettes at the groove in the first periphery and at the second periphery of such cassette at the position corresponding to the groove in the first periphery of the next one of the second cassettes in the stacked relationship, and thereafter transferring each successive one of the second cassettes into the station with the gripping of such cassette at the groove in the first periphery and at the second periphery being released.

51. In a method as set forth in claim 50 wherein the station has an open mouth and wherein each successive one of the second cassettes is aligned with the mouth of the station after the release of the gripping of such cassette at the groove in the first periphery and at the second periphery and before the transfer of such cassette into the station through the open mouth in the station.

52. In a method as st forth in claim 51 wherein individual ones of the second cassettes are rotated to align such cassettes with the open mouth of the station after the release of the gripping of such cassettes at the groove in the first periphery of such cassettes and at the second periphery of such cassettes and before the transfer of such cassettes into the station through the open mouth in the station.

53. In a method as set forth in claim 51 wherein the station has a wall defining the open mouth in the station and wherein individual ones of the second cassettes are moved in a direction having a component substantially parallel to the wall of the station to align such cassettes with the open mouth of the station after the release of the gripping of such cassettes at the groove in the first periphery of such cassettes and at the second periphery of such cassettes but before the transfer of such cassettes into the station.

54. In combination for transferring an image on a master tape to slave tapes, the master tape being disposed in a first cassette having a first supply reel and a first take-up reel, the slave tapes being disposed in second cassettes each having a second supply reel and a second take up reel and each having first and second substantially parallel peripheries and having a groove in the first periphery, first means for defining a first station for holding the second cassettes in a stacked relationship, second means for sequentially gripping each successive one of the second cassettes in the first station at the groove in the first periphery of such cassette and at the second periphery of such cassette at a position in such second periphery corresponding to the position of the groove in the next one of the second cassettes in the first station, third means for defining a second station, fourth means for transferring each successive one of the second cassettes in sequence from the first station to the second station with the second means gripping such successive one of the second cassettes at the groove in the first periphery of such second cassette and at the second periphery of such second cassette at the position in such second periphery corresponding to the position of the groove in the next one of the second cassettes in the first station, and fifth means for transferring the image on the master tape to the slave tape in each successive one of the second cassettes at the second station while the second means is gripping such successive one of the second cassettes at the groove in the first periphery of such cassette and at the second periphery of such cassette at the position in such second periphery corresponding to the position of the groove in the next one of the second cassettes in the first station, sixth means for transferring each successive one of the second cassettes from the second station, after the transfer of the image on the master tape to the slave tape in such successive one of the second cassettes at the second station, while the second means is gripping such successive one of the second cassettes at the groove in the first periphery of such successive one of the second cassettes and at the second periphery in such successive one of the second cassettes at the position corresponding to the position of the groove in the next one of the second cassettes in the first station, seventh means for defining a third station for holding the successive ones of the second cassettes in a stacked relationship, eighth means for transferring each successive one of the second cassettes in sequence to the third station, after the transfer of the image on the master tape to the slave tape in such second cassette at the second station, while the second means is gripping each successive one of the second cassettes at the groove in the first periphery of such successive one of the second cassettes and at the periphery of such second cassette at the position corresponding to the position of the groove in the next one of the second cassettes in the first station.

55. In a combination as set forth in claim 54, the second means being operative to release each successive one of the second cassettes upon the transfer of such successive one of the second cassettes to the third station, and ninth means for transferring each successive ones of the second cassettes into the third station upon the release of such second cassette by the second means.

56. In combination for transferring an image on a master tape to slave tapes, the master tape being disposed in a first cassette having a first supply reel and a first take-up reel, the slave tapes being disposed in second cassettes each having a second supply reel and a second take-up reel and each having first and second substantially parallel peripheries and having a groove in the first periphery, first means for defining a first station for holding the second cassettes in a stacked relationship, second means for sequentially gripping each successive one of the second cassettes in the first station at the groove in the first periphery of such successive one of the second cassettes and at the second periphery of such successive one of the second cassettes at a position in such second periphery corresponding to the position of the groove in the next one of the second cassettes in the first station, third means for defining a third station displaced from the second station, and fourth means for transferring each successive one of the second cassettes in sequence from the first station to the second station with the second means gripping such successive one of the second cassettes at the groove in the first periphery of such successive one of the second cassettes and at the second periphery of such second cassette at the position in such second periphery corresponding to the position of the groove in the next one of the second cassettes in the first station.

57. In a combination as set forth in claim 56, fifth means for transferring the image on the master tape to the slave tape in each successive one of the second cassettes at the second station when such successive one of the second cassettes is transferred to the second station.

58. In a combination as set forth in claim 57, sixth means for transferring each successive one of the second cassettes from the second station after the transfer of the image on the master tape to the slave tape in such successive one of the second cassettes.

59. In a combination as set forth in claim 58, seventh means for defining a third station for holding the successive ones of the second cassettes in a stacked relationship, and eighth means for transferring each successive one of the second cassettes into the third station after the transfer of such successive one of the second cassettes from the second station.

60. In combination for transferring an image on a master tape to slave tapes, the master tape being disposed in a first cassette having a first supply reel and a first take-up reel, the slave tapes being disposed in second cassettes each having a second supply reel and a second take-up reel and each having first and second substantially parallel peripheries and having a groove in the first periphery, first means for transferring the image on the master tape in sequence to the slave tape in each of the second cassettes, second means for defining a station for holding the second cassettes in a stacked relationship, third means for sequentially gripping each successive one of the second cassettes in the first station at the groove in the first periphery of such successive one of the second cassettes and at the second periphery of such successive one of the second cassettes at a position in such second periphery corresponding to the position of the groove in the next successive one of the second cassettes, and fourth means for transferring each successive one of the second cassettes to the station after the transfer of the image on the master tape to such successive one of the second cassettes and while the third means is gripping such successive one of the second cassettes at the groove in the first periphery and at the second periphery of such successive one of the second cassettes at the position in such second periphery corresponding to the position of the groove in the next successive one of the second cassettes.

61. In a combination as set forth in claim 60, fifth means for providing for a release of each successive one of the second cassettes by the third means after the transfer by the fourth means of such successive one of the second cassettes to the station.

62. In a combination as set forth in claim 61, sixth means for transferring each successive one of the second cassettes into the station after the transfer by the fourth means of such successive one of the second cassette to the station and after the release of such successive one of the second cassettes by the fifth means at the station.

* * * * *